US008159955B2

(12) United States Patent
Larsson

(10) Patent No.: US 8,159,955 B2
(45) Date of Patent: Apr. 17, 2012

(54) METHOD AND ARRANGEMENT FOR LINK COST DETERMINATION FOR ROUTING IN WIRELESS NETWORKS

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 354 days.

(21) Appl. No.: 12/065,646

(22) PCT Filed: Oct. 12, 2005

(86) PCT No.: PCT/SE2005/001526
§ 371 (c)(1),
(2), (4) Date: Mar. 4, 2008

(87) PCT Pub. No.: WO2007/043921
PCT Pub. Date: Apr. 19, 2007

(65) Prior Publication Data
US 2008/0298250 A1    Dec. 4, 2008

(51) Int. Cl.
*G01R 31/08* (2006.01)
(52) U.S. Cl. ...................................................... 370/238
(58) Field of Classification Search .................. 370/237, 370/238, 238.1
See application file for complete search history.

(56) References Cited

U.S. PATENT DOCUMENTS

| | | | | |
|---|---|---|---|---|
| 5,706,274 | A * | 1/1998 | Angelico et al. | 370/445 |
| 5,892,769 | A * | 4/1999 | Lee | 370/447 |
| 6,816,460 | B1 * | 11/2004 | Ahmed et al. | 370/238 |
| 6,922,405 | B2 * | 7/2005 | Eikelenboom et al. | 370/338 |
| 7,336,608 | B2 * | 2/2008 | Sin et al. | 370/232 |
| 7,397,785 | B2 * | 7/2008 | Wu et al. | 370/350 |
| 2003/0003916 | A1 * | 1/2003 | Foster et al. | 455/442 |
| 2004/0085993 | A1 * | 5/2004 | Wentink | 370/447 |
| 2005/0249185 | A1 * | 11/2005 | Poor et al. | 370/349 |

FOREIGN PATENT DOCUMENTS

| | | |
|---|---|---|
| JP | 2005518717 | 6/2005 |
| JP | 2006518957 A | 8/2006 |
| WO | 03/061310 A1 | 7/2003 |
| WO | 03/071751 A1 | 8/2003 |
| WO | 2004/077746 | 9/2004 |
| WO | 2005/060170 A1 | 6/2005 |
| WO | 2005/064864 A1 | 7/2005 |

OTHER PUBLICATIONS

Schiller, J. H. "Mobile Communications." Addison-Wesley 2000. ISBN: 0 204 39836.
Perkins, C. et al. "Ad Hoc On-Demand Distance Vector (AODV) Routing." Network Working Group, RFC 3561, Jul. 2003. Available at: http://www.ietf.org/rft/rfc3561.txt.
Jain, K. et al. "Impact of Interference on Multi-Hop Wireless Network Performance." Mobil Com 2003, Sep. 14-19, 2003, San Diego, CA.

* cited by examiner

*Primary Examiner* — Derrick Ferris
*Assistant Examiner* — Mohammad Anwar
(74) *Attorney, Agent, or Firm* — Coats & Bennett, P.L.L.C.

(57) ABSTRACT

The invention relates to determination of a link cost employable in route determination and data forwarding in a multihop communication network (1). This link cost is adapted to the particular characteristics of wireless contention-based networks (1), in which both network nodes (10, 20) involved in node-to-node data forwarding block neighbor nodes (30, 40, 50) that have to defer medium access during the data forwarding. The link cost is determined based on the estimated total number of nodes (30, 40, 50) that are blocked if data is forwarded on a wireless link (12) from a node (10) to another node (20). The link cost may also be based on a per bit normalized expected transmit duration for the data forwarding in combination with said estimated number of nodes. Usage of the link cost in route determination minimizes the number of truly blocked nodes in the network (1) and increased the network capacity.

25 Claims, 13 Drawing Sheets

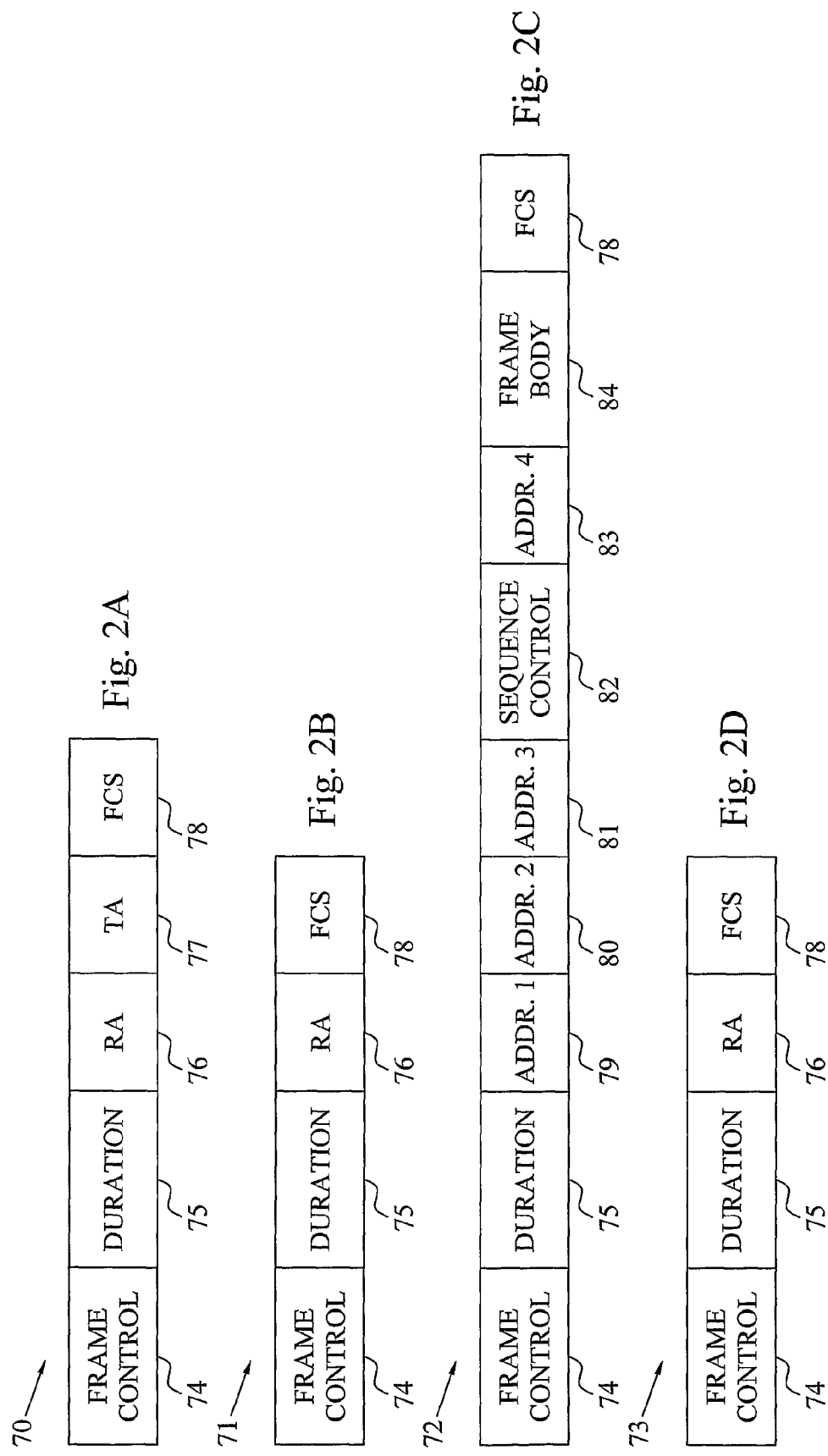

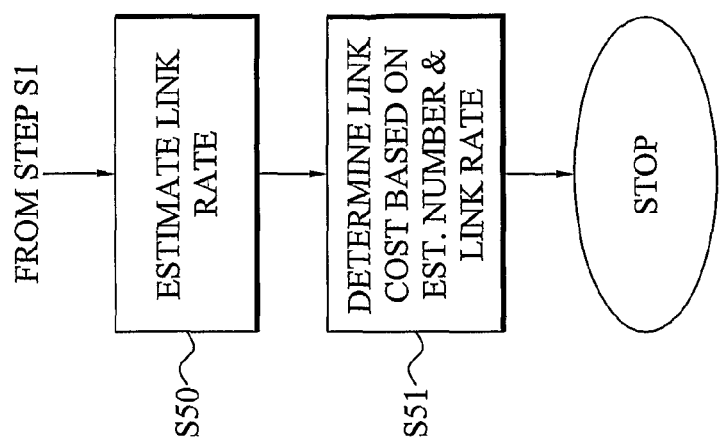
Fig. 14
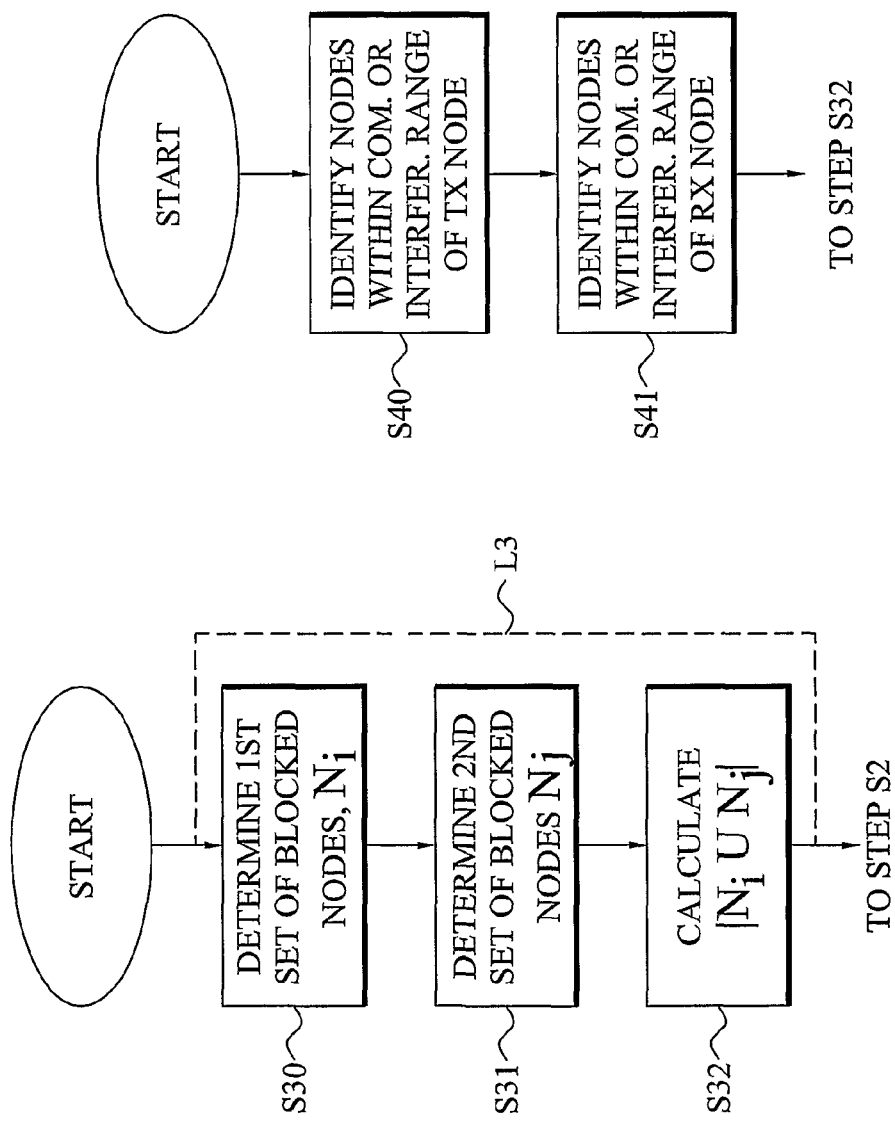
Fig. 12
Fig. 11

| NODE SET $N_4$ | | |
|---|---|---|
| NODE IDENTIFIER | TIME-TO-LIVE VALUE | LINK COST |
| $v_0$ | $t_0$ | $\Delta C_{4,0}$ |
| $v_1$ | $t_1$ | $\Delta C_{4,1}$ |
| $v_2$ | $t_2$ | $\Delta C_{4,2}$ |
| $v_3$ | $t_3$ | $\Delta C_{4,3}$ |
| $v_5$ | $t_5$ | $\Delta C_{4,5}$ |
| $v_7$ | $t_7$ | $\Delta C_{4,7}$ |
| $v_8$ | $t_8$ | $\Delta C_{4,8}$ |

METHOD AND ARRANGEMENT FOR LINK COST DETERMINATION FOR ROUTING IN WIRELESS NETWORKS

TECHNICAL FIELD

The present invention generally relates to routing in communication networks, such as multihop networks, and more particularly to the issue of determining appropriate link cost metrics for use in route determination and routing in such networks.

BACKGROUND

In the last decades there has been an explosion in the usage of wireless communication for transmitting data between communicating stations or nodes. With this increase in wireless data communication, different types of wireless communications networks are developed that e.g. employ different media or medium access standards. A recently developed such medium access scheme is the Floor Acquisition Medium Access (FAMA) scheme. This medium access technique is, for example, implemented and used in IEEE 802.11 Wireless Local Area Networks (WLANs) and other contention-based networks. In these FAMA-based networks, the communication of data from a transmitting node or station to a receiving node temporarily blocks any transmission of other network nodes that potentially may overhear the data communication. This means that a node first have to verify the absence of other traffic before transmitting data on the shared physical medium.

Today, IEEE 802.11 enables single hop communication between nodes or stations in an independent basic service set mode. However, multihop support for the IEEE 802.11 and other contention-based networks is a desirable feature. This is because in a multihop network, nodes out of reach from each other may benefit from intermediately located nodes that can forward their messages from the source towards the destination. An additional benefit with multihop support is that by dividing a distance in multiple hops, each hop will experience significantly improved signal reception quality. Consequently, this can be exploited through usage of higher link rate that under certain conditions can reduce the end-to-end delay.

Traditionally, multihop networks have often been associated with so-called ad hoc networks where nodes are mostly mobile and no central coordinating infrastructure exists. However, the idea of multihop networking can also be applied when nodes are fixed. In addition, one can also envision central coordination, in particular when nodes are fixed and channels are robust. One may also envision hybrid networks involving wired links in addition to wireless links in multihop networks.

Routing, i.e. the act of moving information from a source to a destination via one or more intermediate nodes in a communication network, generally involves two basic tasks: determining suitable routing paths and transporting information through the network. In the context of the routing process, the first of these tasks is normally referred to as route determination and the latter of these tasks is often referred to as data or packet forwarding.

For route determination, a common approach is to span a so-called routing tree. The routing tree is normally calculated based on a shortest path algorithm, implying that the determined shortest paths from the various nodes in the tree to the destination node are so-called "least or minimum cost paths". In practice, the tree may be continuously built and updated to manage mobility and changing link conditions.

When a particular node in the tree wants to send a packet in the subsequent packet forwarding process, the node is considered a source node, and the packet follows the determined routing path from the source to the destination. Different nodes may send packets to the same destination over time, hence different nodes will act as source nodes and send along their respective shortest path. In addition, as multiple destinations may exist, multiple trees may be generated, each rooted at a corresponding destination.

Packet forwarding is normally relatively straightforward, whereas path or route determination can be very complex.

Routing protocols generally use so-called routing metrics as a base for evaluating which path or route that will be the best for a given packet and thereby determining the optimal path to the destination. In the prior art, many different metrics have been used by the routing algorithms to determine the best, or at least a suitable route.

A classical wireline hop metric is unsuitable in a wireless environment, basically since it does not reflect the link quality dependency with respect to distance. An example of a wireline metric of less use in wireless situations, yet frequently encountered, is a simple hop count metric, where the link cost $\Delta C_{ij}$ from node $v_i$ to $v_j$ is defined as $\Delta C_{ij}=1$.

Another metric that has been suggested in the research literature is based on the physical distance between two nodes, e.g. $\Delta C_{ij}=\text{Distance}_{ij}$.

A better example suited for a radio environment is to use the estimated average link rate and define link cost as the inverse of the average link rate, i.e. $\Delta C_{ij}=1/\bar{r}_{ij}$, assuming rate adaptation capabilities. This metric can be seen in two ways. First, for a fixed sized packet, it strives to offer minimum delay paths (assuming that the queuing delay in the network is negligible). However, in the context of a multihop scheme with a fixed sized data phase (with varying number of packets in a data phase depending on rate adaptation) it offers the least time resource utilization along a path. The average rate based link metric can be estimated by the classical Shannon capacity:

$$\bar{r}_{ij} = B \cdot E\left(\log_2\left(1 + \frac{G_{ij}P_i}{\sigma_N^2}\right)\right), \quad (1)$$

where B is the bandwidth (may be neglected if only one common bandwidth is used in the whole system), $E\{\ldots\}$ is the expectation value, $P_i$ is the transmit power of node $v_i$ (which may be fixed or determined by some other mechanism), $\sigma_N^2$ is the noise level (at node $v_j$) and $G_{ij}$ is the average link gain. The term, $\sigma_N^2$ could potentially also include average interference, modeled as complex Gaussian noise, apart from receiver noise.

Yet another example, suited for a radio environment, is the inverse of the average link gain, i.e. $\Delta C_{ij}=G_{ij}^{-1}$. This metric provides large receiver SNR (Signal-to-Noise Ratio) values (with fixed power), and minimum power routes (with power control). This is not a bad metric, but it may lead to a situation where packets will experience long delays (mainly since it does not reflect the capacity of a link appropriately).

Using the Shannon capacity for the inverse gain metric case described above, it is seen that it corresponds to minimum power routing with a given target link rate $\bar{r}_{ij}^{(Target)}$. The minimum power is then determined as:

$$P_i = \left(2^{\frac{r_{ij}^{(Target)}}{B}} - 1\right)\frac{\sigma_N^2}{G_{ij}} \qquad (2)$$

Although the prior art link costs and routing metrics work fairly well for several wireless communications networks, they are not adapted to the specific characteristics of node blocking present in IEEE 802.11 and other contention- or FAMA-based communications networks.

SUMMARY

There is, thus, a great need for a link cost and routing metric that is adapted to the specifics of 802.11 WLAN and other contention- or FAMA-based networks in order to enable an efficient usage of multihop (routing) support in such communications networks.

The present invention overcomes these and other drawbacks of the prior art arrangements.

It is a general object of the present invention to provide improved routing in wireless or at least partially wireless multihop networks. In particular, it is desirable to provide higher throughput and reduced delay in such networks.

It is an object of the invention to provide improved route selection or route determination by use of enhanced routing metrics.

It is a specific object to provide an improved method and arrangement for determining link cost for routing in a contention-based multihop network.

It is also a specific object to provide a method and arrangement for route determination based on enhanced link cost determination in such a network.

Another specific object is to provide a method and arrangement for routing based on enhanced link cost determination.

These and other objects are met by the invention as defined by the accompanying patent claims.

Briefly, the present invention involves determining link costs and usage of such link costs in route determination and data forwarding in contention-based communication networks.

The link cost of the present invention is adapted to the particular characteristics of such contention-based communication networks, in which data forwarding between communicating network nodes blocks neighbor nodes and thereby prevents these neighbor nodes from accessing the shared physical medium during the ongoing data forwarding. In contention-based networks, the nodes compete for the shared physical media. This means that a network node can only transmit data when the media is free and clear of signals. Consequently, a transmitting network node will, thus, block other nodes overhearing or detecting the transmission and therefore temporarily prevent these blocked nodes from transmitting data.

According to the present invention, typically, not only the network node that has data to forward, has the potential to block neighbor node but also the intended receiving node can block other nodes. This is due to that the data forwarding is typically not a unidirectional transmission but is most often preceded and/or followed by control traffic exchange, in which both participating nodes may actually transmit and receive data. For example, in some communication networks, the forwarding of payload data may be preceded by a request-to-send message sent by the node that has payload data to forward. The intended receiving node replies with a clear-to-send message and firstly thereafter will the actual payload forwarding be performed. In addition, once the forwarding process has been successfully completed the receiving node may reply with an acknowledgement (ACK) message, or reply with a non-acknowledgement message if the data forwarding was unsuccessful.

As a consequence, according to the present invention, the determination of a link cost for a wireless link between a pair of network nodes is, at least partly, based on an estimated total number of (neighbor) nodes that are or would be blocked if data is forwarded on the wireless link.

The estimation of the number of blocked nodes may be realized by determining a first set of nodes that would be blocked if a first node of the node pair transmits data (e.g. request-to-send message and payload data) on the wireless link to a second node of the node pair. Similarly, a second set of nodes that would be blocked if the second node transmits data (e.g. clear-to-send and ACK messages) on the link to the first node is also provided. The union of these two sets may then be determined to obtain a combined set of blocked nodes. The link cost can then be determined based on the calculation of the cardinal number of the combined set.

This link cost can be used, preferably together with a shortest path algorithm, to perform a route determination in the wireless contention-based network. The so-determined route may be employed for forwarding data from a source node to a destination node through the network.

This contention-adapted link cost of the invention will minimize the accumulated number of truly blocked nodes along a path and allows more nodes in the network to be concurrently active. As a consequence, the total network capacity will be increased.

The link cost for a wireless link may be based solely on the estimated number of blocked nodes as described above. However, other parameters may also be employed. For example, link quality data can be used in the link cost determination, e.g. in the form of an estimation of a current quality (Signal-to-Noise Ratio) margin for the relevant wireless link. In such a case, links that experience a high link quality will be favored compared to low quality links.

In a preferred embodiment, an expected transmit duration for the data forwarding, preferably normalized per bit, is used together with the estimated number of blocked nodes in the link cost determination. By incorporating the communication duration with the estimated number of blocked nodes, the link cost helps finding a path, during route determination, which avoids long blocking exposures as well as strives for minimizing the number of blocked nodes. Apart from offering a heuristically good path, i.e. with few hops and low delay, the combined usage of number of blocked nodes and transmit duration strives to yield a heuristically near minimum delay path.

Each node in the network preferably generates and updates the set or list of neighbor nodes that would be blocked in the case the node forwards data to another node. The nodes can communicate their sets to neighbor nodes. Each node then determines the union of its own set with each of the received sets to obtain the estimated number of nodes that would become blocked if the node forwards data to the neighbor nodes.

In an alternative implementation, a node itself compiles the sets of blocked nodes for its neighbor nodes by identifying, for a given neighbor node, the nodes that are able to communicate with this given neighbor node. This identification can be realized by overhearing and catching the messages sent to and from the given node and reading the message headers containing transmitter and receiver addresses.

Also a centralized solution is possible, in which a dedicated unit in the network receives the information of the sets of blocked nodes from the nodes in the network and calculates the union of each such pair of set from neighbor nodes.

In a preferred embodiment, the combined set as obtained by taking the union of two sets also includes the (two) nodes that participate in the data forwarding. This means that if the node that has payload data to send would, if sending the data, block seven nodes and the node that is the intended receiver of the data would block five nodes, the first set would include the identifiers of the seven nodes and the second set would contain identifiers of the five nodes. It could be possible that e.g. three of the nodes found in the first set are also present in the second set, i.e. these three nodes may be blocked by both communicating nodes. The cardinal number of the union of the first and second set would then be nine and not twelve. If the two communicating nodes were also regarded, the number would instead be eleven.

The present invention is advantageously adapted to Floor Acquisition Medium Access (FAMA) based networks, such as IEEE 802.11 wireless local area networks, in which nodes can be blocked both due to a physical and virtual carrier sensing mechanism. However, the invention can also be applied to other contention-based networks, in which data forwarding will block neighbor nodes within communication and/or interference/detection range from the communicating nodes.

The invention offers the following advantages:
Specially adapted to the characteristics of contention-based communication networks;
Allows efficient implementation of multihop routing in contention-based networks;
Minimized the accumulated number of blocked nodes along a path in a multihop wireless network;
Allows more network nodes to be concurrently active during data forwarding and enables a high network capacity;
Optimal route selection by finding paths with few hops and low delay; and
Generally applicable to any routing protocol.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIGS. 1A to 1D schematically illustrate the principles of a wireless communication network employing carrier sense multiple access with collision avoidance and request-to-send and clear-to-send message exchange;

FIGS. 2A to 2D schematically illustrate possible frame formats for the messages exchanged between the network nodes in FIGS. 1A to 1D;

FIG. 3 schematically illustrates the principles behind physical and virtual channel sensing in the blocking of network nodes;

FIG. 4 schematically illustrates the principles behind virtual channel sensing in the blocking of network nodes when fragmentation is employed;

Figure 5:
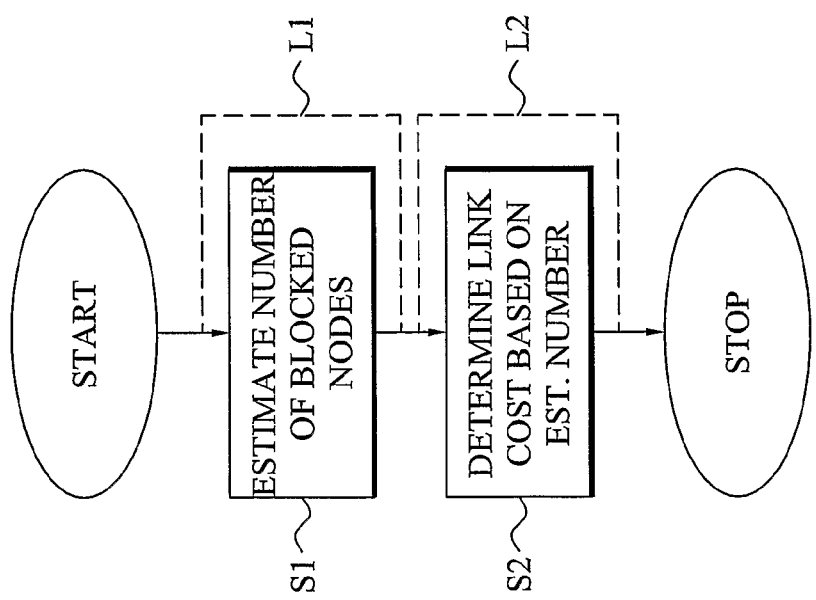
FIG. 5 is a flow diagram illustrating an embodiment of a method of determining a link cost for routing according to the present invention.
Figure 9:
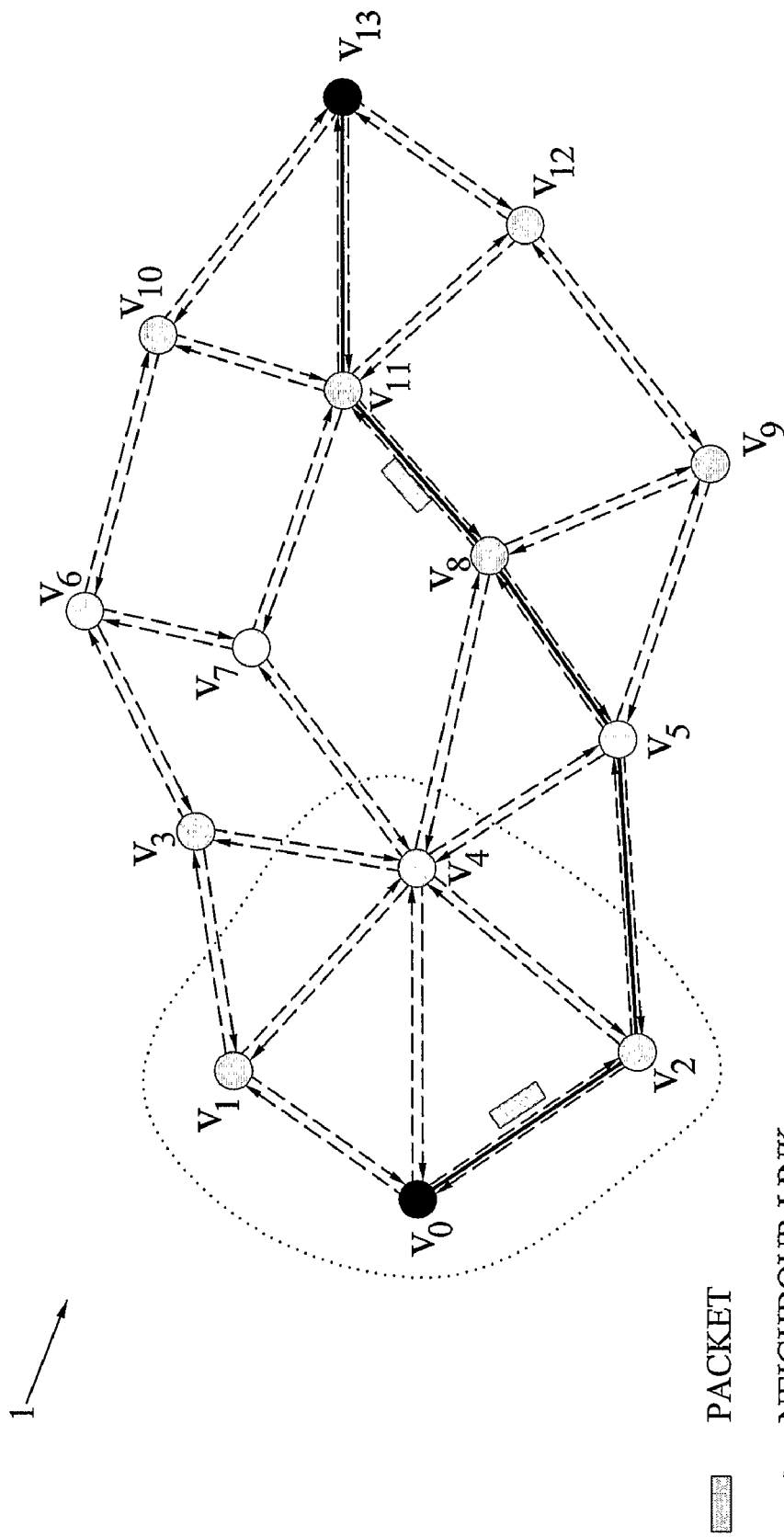
Figure 10:
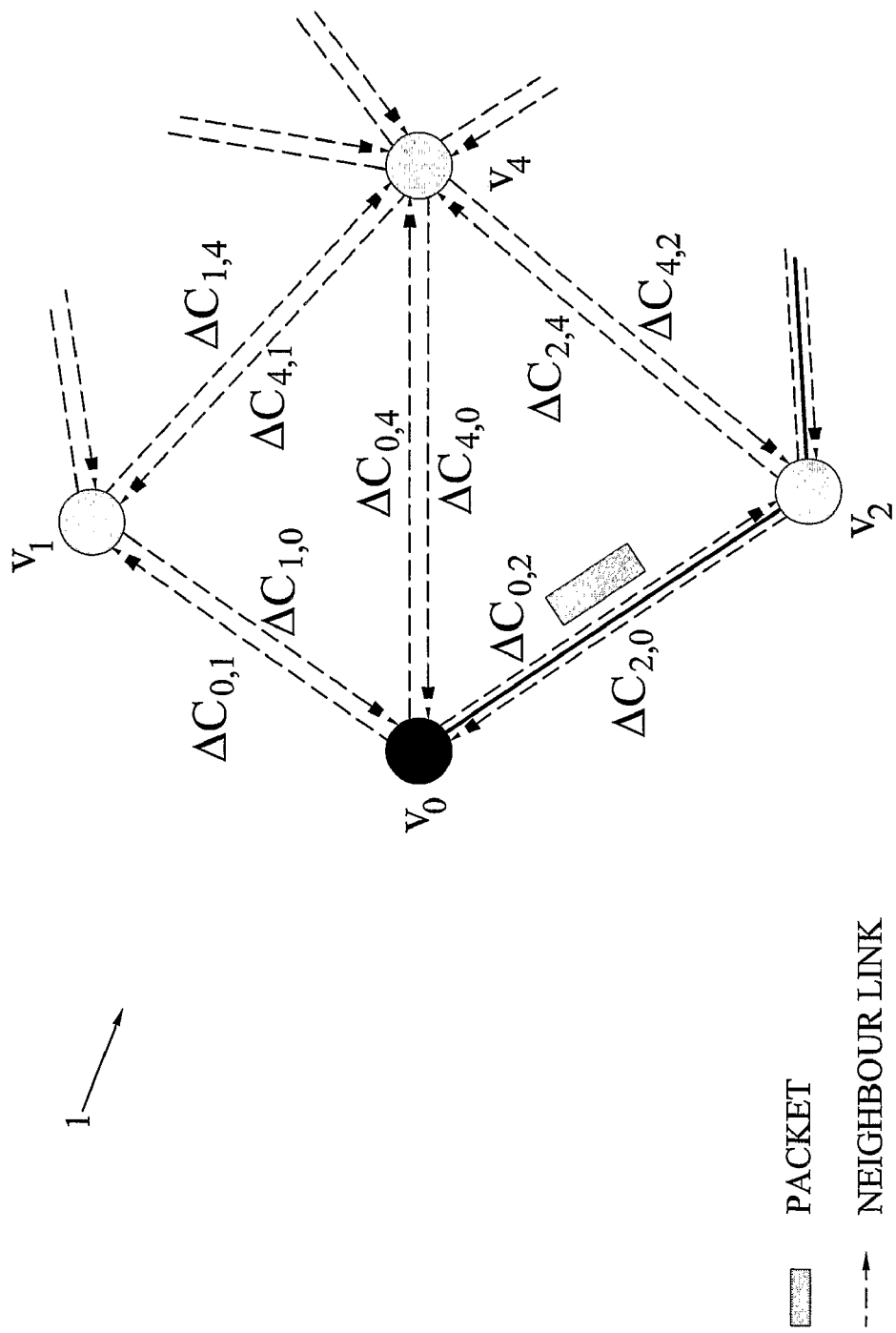
Figure 15A:
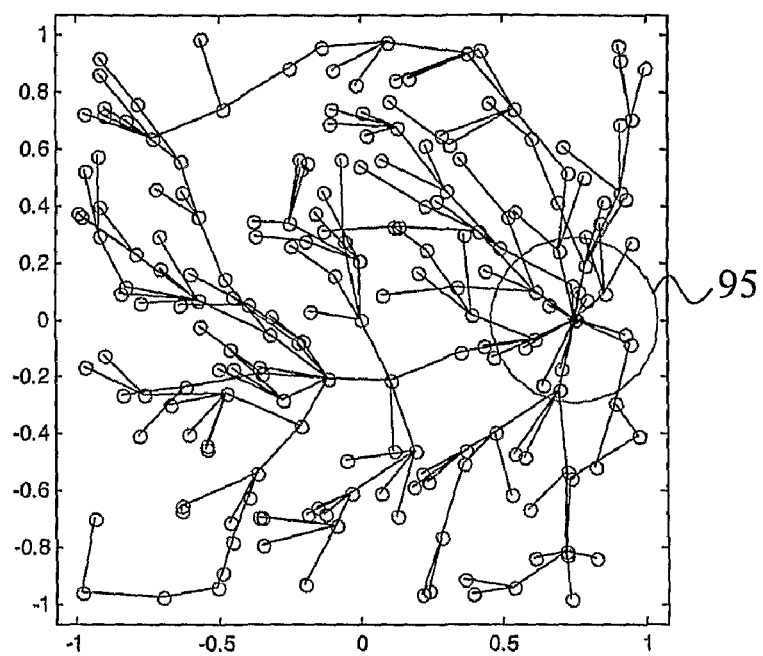
Figure 15B:
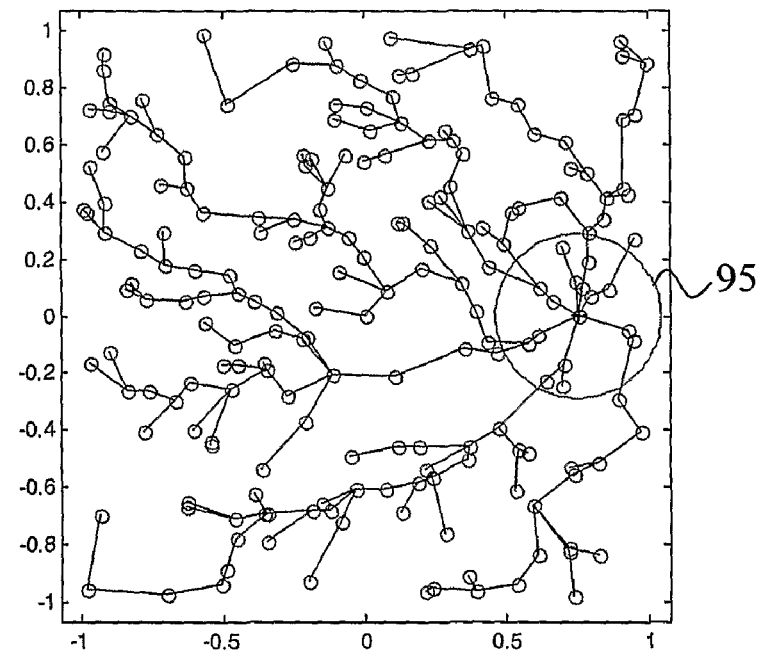
Figure 16:
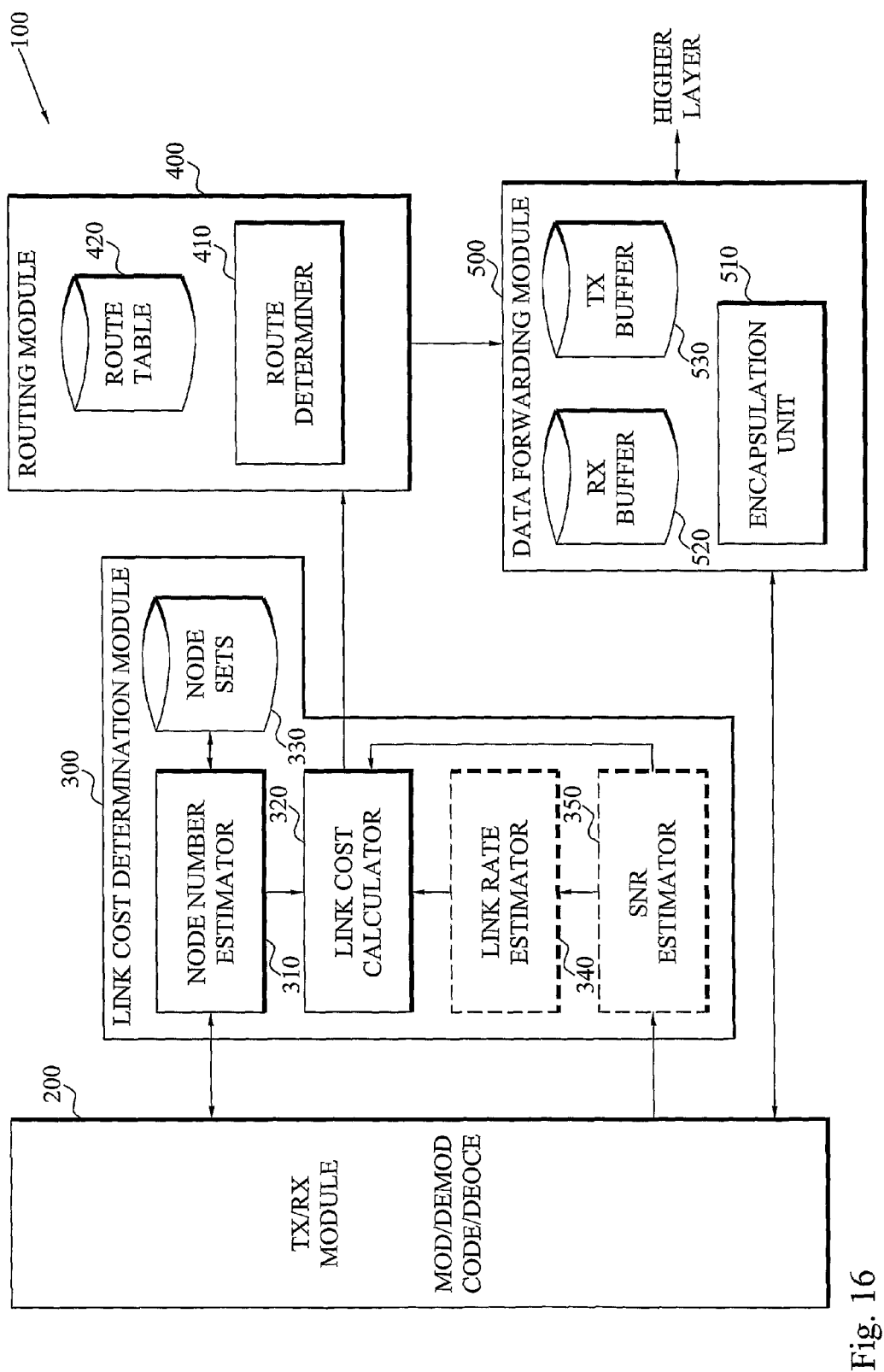
Figure 17:
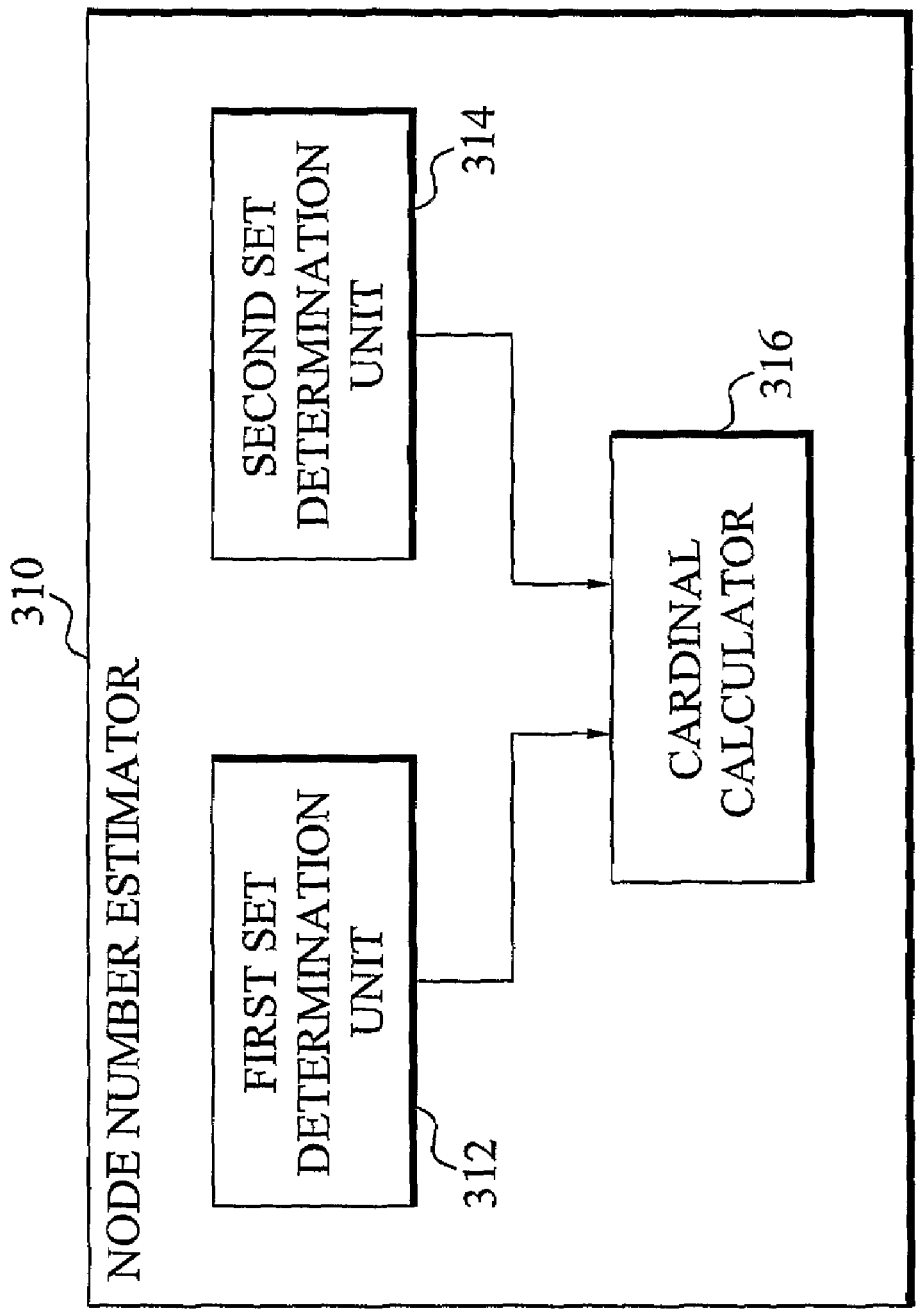

FIG. 9 schematically illustrates packet forwarding between a source node and a destination node in a wireless communications network according to the present invention;

FIG. 10 is a magnification of a portion of the communications network illustrated in FIG. 9;

FIG. 11 is a flow diagram illustrating an embodiment of the estimating step of the method in FIG. 5 in more detail;

FIG. 12 is a flow diagram illustrating an embodiment of the set determining steps of the method in FIG. 11 in more detail;

FIG. 13 schematically illustrates a list of nodes blocked by a network node in a wireless communications network according to the present invention;

FIG. 14 is a flow diagram illustrating an embodiment of the link cost determining step of the method in FIG. 5 in more detail;

FIGS. 15A and 15B are shortest path trees obtained according to two embodiments of the present invention;

FIG. 16 is a schematic block diagram of a network node comprising an arrangement for determining a link cost, an arrangement for link-cost based route determination and an arrangement for link-cost based data routing according to the present invention; and FIG. 17 is a schematic block diagram of an embodiment of the node number estimator of FIG. 16.

DETAILED DESCRIPTION

Throughout the drawings, the same reference characters will be used for corresponding or similar elements.

The present invention relates to wireless routing in wireless, or at least partly wireless, communication networks, in which transmission of data by a network node temporarily blocks or prevents other nodes overhearing or detecting the data transmission from accessing the shared medium and transmitting data. A first aspect of the invention is directed to the determination of a link cost for routing that is applicable in and adapted to the characteristics of such communication networks. In a second aspect of the invention, the determined link cost is employed for performing route determination in the communication networks. A third aspect of the invention relates to link-cost based routing of data in these communication networks.

In order to facilitate understanding of the present invention, a discussion of the characteristics of the communication networks in which the invention is preferably implemented is first presented herein followed by an introduction of data routing.

Network Description

The present invention is in particular adapted and suited for implemented in a wireless, or at least partly wireless, contention-based communication network, i.e. such networks that employ contention-based media access. In these networks, the stations and network nodes compete or contend for the shared physical media. This means that a network node can only transmit data when the media is free and clear of signals. Consequently, a transmitting network node will, thus, block other nodes overhearing or detecting the transmission and therefore temporarily prevent these blocked nodes from accessing the media and communicating data until the transmission is completed.

A typical example of such contention-based media access is the Floor Acquisition Medium/Multiple Access (FAMA) scheme. This class of access protocol, that acquires a "floor" or equivalently blocks a set of nodes from using the medium, has closely related cousins, including but not limited to Multiple Access with Collision Avoidance (MACA) and Distributed Foundation Wireless Media Access Control (DFWMAC). DFWMAC is used in IEEE 802.11 and is then denoted Distributed Coordination Function (DCF). Common for all these medium access schemes is that they are based on Carrier Sense Multiple Access (CSMA). CSMA is a non-deterministic Medium Access Control (MAC) protocol in which a network node verifies the absence of other traffic before transmitting on the shared physical medium.

The CSMA access method is often used in combination with Collision Avoidance (CA) mechanisms in the form of Carrier Sense (CS), which concerns the fact that a network node listens for carrier signals before trying to send. This means that the node tries to detect the presence of an encoded signal from other nodes in the network before attempting to transmit. If a carrier signal is sensed, the node waits for the transmission in progress to finish before initiating its own data transmission. The CS concept is typically divided into two different CS mechanisms, denoted physical or logical CS and virtual CS.

According to the physical CS mechanism, a network node continuously or intermittently investigates whether the physical medium is busy. In this context, a network node typically regards the medium as busy and should refrain from transmitting data if an experienced power sensitivity level is exceeded. For example, if the node detects a signal power level in the medium that exceeds a minimum signal threshold, typically denoted Clear Channel Assessment (CCA) level in some communication networks, the medium is regarded as busy. Alternatively, the medium is regarded as occupied if the interference experienced by the network node exceeds a minimum interference threshold. In either case, if the node considers the physical medium as busy it refrains from sending data and is regarded as blocked according to the present invention.

The CSMA/CA protocol often reduces the probability of collisions among nodes sharing the medium by utilizing a random backoff time after the node's physical sensing mechanism indicates a free medium.

The principles of this CSMA/CA scheme will be illustrated with reference to the IEEE 802.11 Wireless Local Area Network (WLAN) operating in an Independent Basic Service Set (IBSS) (infrastructure-less or ad hoc) mode. IEEE 802.11 WLAN employs the previously mentioned DCF scheme. There are two modes of channel access scheme operation in the DCF, one based on CSMA/CA and one CSMA/CA including Request-To-Send/Clear-To-Send (RTS/CTS) message exchange. A Management Information Base (MIB) attribute dot11RTSThreshold is used to differentiate the use of the two. MAC Protocol Data Units (MPDUs) shorter than the threshold is sent without RTS/CTS, whereas longer MPDUs are sent with RTS/CTS. The focus here is the RTS/CTS-based CSMA/CA mechanism that enables mitigation of hidden stations and hence in general provides a more efficient use of the wireless medium, at least for moderately large packets. However, this should merely been seen as an illustrative, but non-limiting, example according to the present invention.

FIGS. 1A to 1D schematically illustrate a portion of a wireless contention-based network 1 that employs RTS/CTS-based CSMA/CA and physical CS. In these figures, payload data is to be forwarded from a first node 10 to a second node 20 on a wireless link. The first node 10 has a given transmit range enclosing an area 15. Other network nodes 30, 50 present within this area will sense the data forwarding of the transmitting 10 and are consequently blocked by such data forwarding. Corresponding, the second node 20 has a given transmit range enclosing an area 25, which may differ in size and shape compared to the blocking area 15 of the transmitting node 10. This means that other network nodes 40, 50 present within this blocking area 25 will become blocked if the second node 20 transmits data on the wireless link to the first node 10. As is clearly evident from the figures, some network nodes 50 may actually be blocked by both the first 10 and second 20 nodes, whereas other nodes 60 are not present within the blocking area 15, 25 of either of the two nodes 10, 20 and will, consequently, not be blocked by any of the relevant nodes 10, 20.

In the discussion above, one mechanism (physical CS) of determining whether a node is blocked or not have been given, i.e. blocked if the node is within interference range of a transmitter. However, in other communication networks other definitions and mechanisms of determining blocking node may be used. Actually, it is even possible that multiple "parallel" blocking mechanisms may be present in a given communication network, which will be illustrated below with the combined usage of physical and virtual CS. In such a case, a network node is defined as blocked according to the present invention if blocked according to at least one of these multiple blocking mechanisms.

Figure 1A:
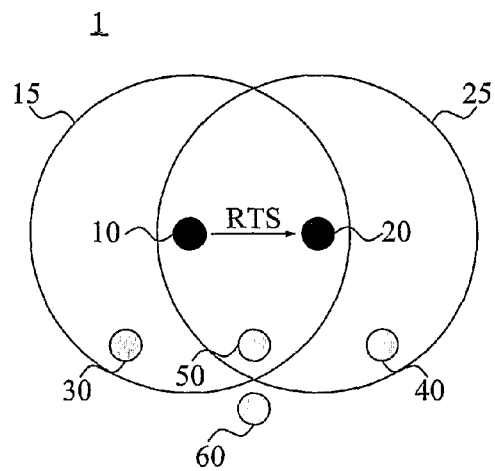
Figure 1B:
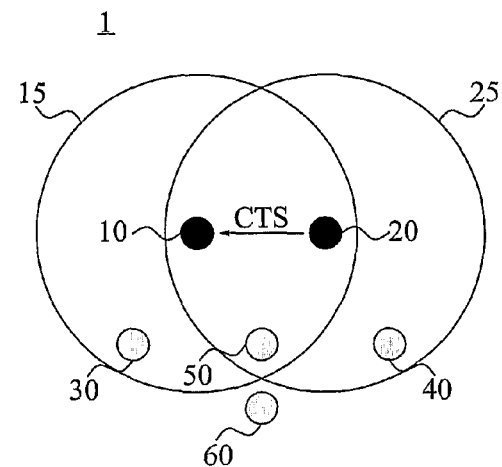
Figure 1C:
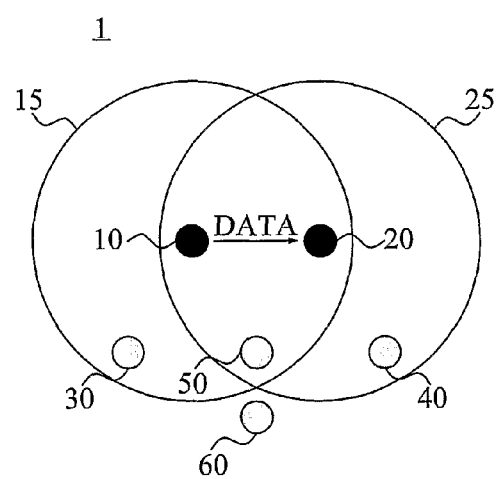
Figure 1D:
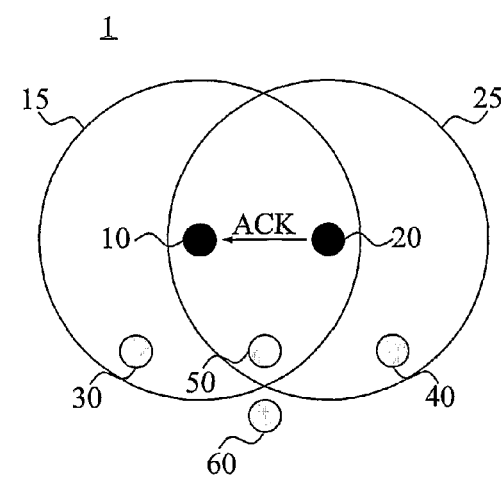

In FIG. 1A the first node 10 has payload data in its transmit buffer that it wants to forward to the second node 20. The data forwarding starts with the first node 10 sending a RTS message to the second node 20. This RTS-transmission is detected by the network nodes 30, 50, which will, thus, become temporarily blocked. In FIG. 1B the second node 20 returns a CTS message that will block the network node 50 that already was blocked by the previous RTS message and the new node 40. In response to reception of the CTS message, the first network node 10 now can transmit its payload data to the second node 20 in FIG. 1C. This payload transmission may block the same network nodes 30, 50 as the previous RTS transmission. However, e.g. because of different radio conditions, such as current fading conditions, employed transmission power levels and topology changes, due to mobility of the nodes 10, 20, 30, 40, 50, 60, the nodes 30, 50 blocked by this payload transmission may differ from the nodes 30, 50 blocked by the previous RTS transmission. If the second node 20 could successfully receive and decode the payload data, it returns an acknowledgement (ACK) message in FIG. 1D that will, in the figure, block the same nodes 40, 50 as the previous CTS message. However, the principle discussed above for the blocking of the payload data versus the RTS applies to the blocking of the ACK versus the CTS.

In FIGS. 1A to 1D, the network node 40 is a hidden node for the first node 10 and it is informed by the intention of the first node 10 to transmit via the CTS message received from second node 20. As a consequence, the network node 40 will not transmit and disturb the ongoing reception by the second node 20. The nodes 30 and 50 will in a similar manner defer channel access overhearing RTS and/or CTS, whereas the network node 60 may transmit as it has not overheard the RTS or the CTS frame.

In the present description, the expression "transmitting node" refers to the network node that has payload data that it will forward to a receiving node. As is illustrated in FIGS. 1A to 1D, in which the first node 10 has the role of transmitting node and the second node 20 is the receiving node, such a payload transmission can actually induce forwarding of other messages (RTS, CTS, ACK). In this induced communication, the transmitting node may actually receive data and the receiving node may actually transmit data. However, the concept of transmitting/receiving node as defined and employed herein refers to the transmission of payload and other "useful" data.

FIGS. 2A to 2D illustrate the frame format for the RTS 70, CTS 71, payload 72 and ACK 73 frames as used in IEEE 802.11. The RTS frame 70 comprises a frame control field 74, a duration field 75, a Transmitter Address (TA) field 77, a Receiver Address (RA) field 76 and a Frame Check Sequence (FCS) 78, see FIG. 2A. The CTS 71 and ACK 73 frames, likewise, comprise frame control 74, duration 75, RA 76 and FCS 78 fields, see FIGS. 2B and 2C. Finally, payload frame 72 of FIG. 2C contains the frame control field 74, duration field 75, four address fields 79, 80, 81, 83, a sequence control field 82, a frame body 84 and the FCS field 78. The portions of these frames 70, 71, 72, 73 that are particularly interesting from the point of view of the present invention are the duration field 75 and the address fields 76, 77, 79-83, which is discussed in more detail below.

As the person skilled in the art knows, the duration fields 75 contain a duration value that is employed for providing an additional collision avoidance mechanism to the physical CS, namely the virtual CS. The duration values reflect the expected time at which the communication between the transmitting and receiving nodes is completed. The mechanisms behind this virtual CS will now be briefly surveyed with reference to the frame exchange depicted in FIG. 3.

Figure 3:
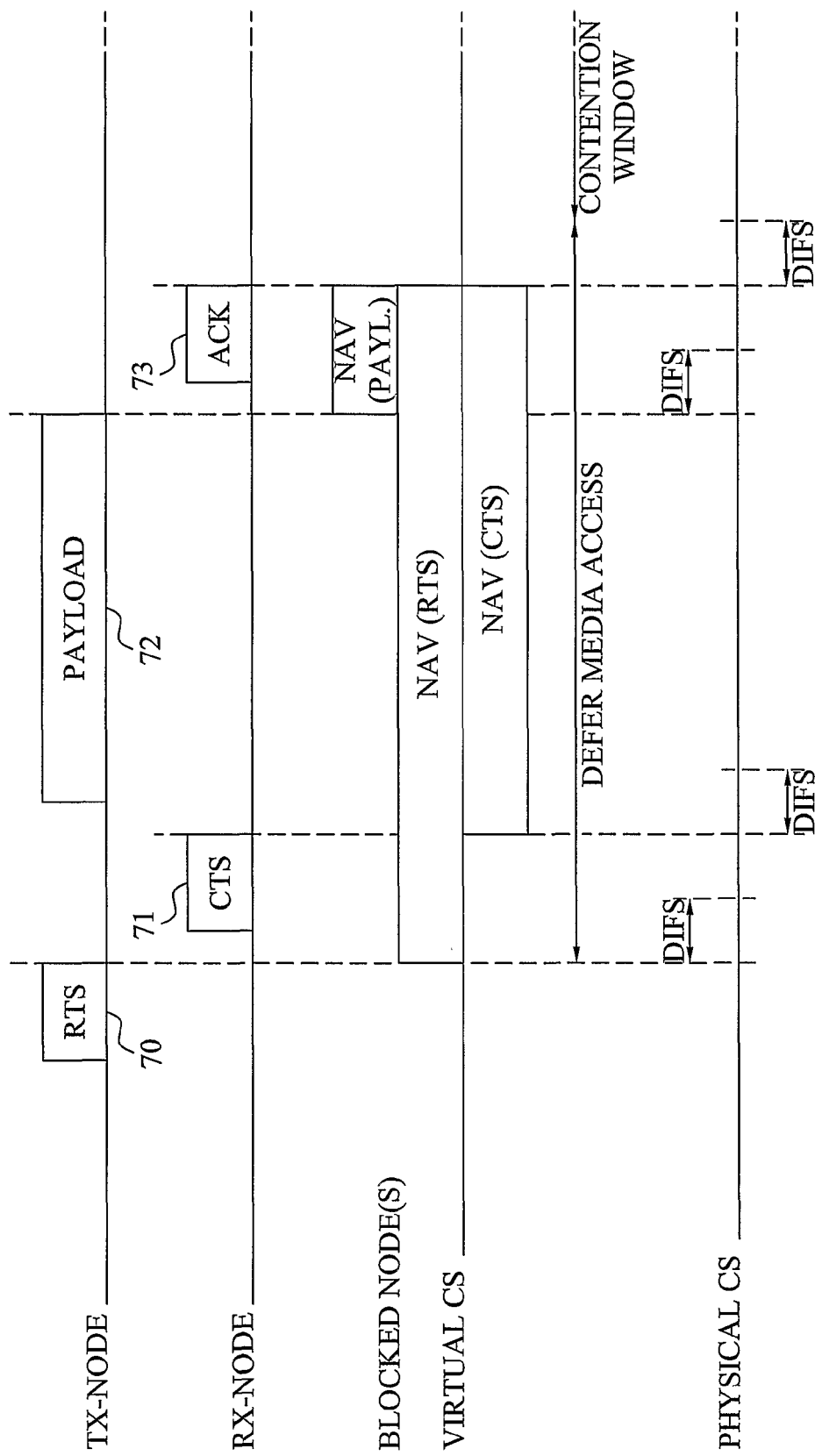

In FIG. 3, the two top lines denote the transmission occasions of the transmitting node, which sends a RTS frame 70 and a payload frame 72, and the receiving node, which returns a CTS 71 frame and an ACK frame 73. When frames 70, 71, 72 are received (overheard) by other network nodes than the intended, a so called Network Allocation Vector (NAV) is set in accordance to the duration value indicated in the overheard frame 70, 71, 72. This means that a network node overhearing and decoding e.g. the RTS frame 70, will extract the duration value included in the frame and set its NAV based on this duration value. As is clearly evident from FIG. 3, the duration values of the RTS 70, CTS 71 and payload 72 frames are typically different, reflecting that the three frames 70, 71, 72 are transmitted sequentially. This is because an overhearing network node should be blocked and defer media access until the data forwarding is completed, irrespectively of whether the network node overhears the RTS frame 70 or one of the CTS 71 and payload 72 frames. This means that the duration value and NAV associated with the RTS frame 70 are typically larger than the value and NAV related to the CTS frame 71 and payload frame 72. The latter frame 72 has associated duration values and NAV that in turn typically are smaller than of the CTS frame 71.

The CTS frame 71 is preferably sent with the same link rate as the RTS frame 70 and the ACK frame 73 is preferably sent with the same link rate as the payload frame 72. The advantage with such a procedure is that it enables the transmitting node to calculate the duration value prior the RTS-transmission.

The two bottom lines represent blocked nodes, which may be blocked due to the physical carrier sensing and/or virtual carrier sensing. As is illustrated in connection with the topmost of these two bottom lines, once a node overhears one of the data messages 70, 71, 72 it extracts the duration value and sets it NAV vector based on the extracted duration value. The set NAV vector will prevent the overhearing node from accessing the media until the data forwarding between the transmitting and receiving node is completed and the channel becomes free.

As is known by the person skilled in the art, nodes in e.g. an IEEE 802.11-based network, continuously check whether the medium is occupied and a media access can be conducted. In this physical carrier sensing, a node should of course not access the media if it detects signaling in the media. In addition, the node should not access a busy channel until a, possibly fixed, minimum time has elapsed, denoted DCF Inter-Frame Space (DIFS) in IEEE 802.11, since the last time the channel was occupied. This is schematically illustrated by the lowest line in FIG. 3.

Figure 4:
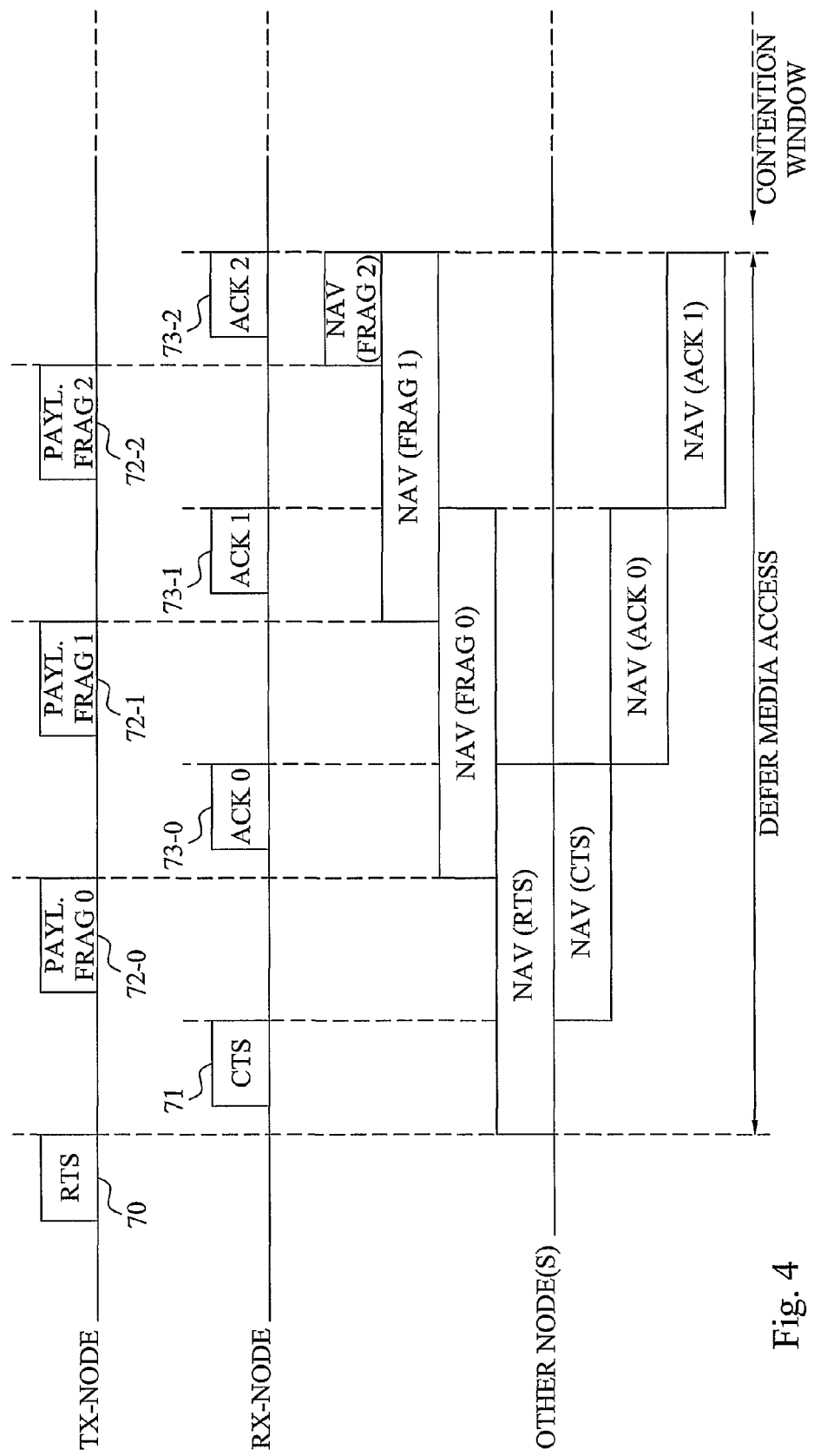

This principle of blocking and RTS/CTS-usage can also be applied to fragmentation of the payload data, which is evident from FIG. 4. Each payload fragment 72-0 to 72-2 is associated with a respective ACK frame 73-0 to 73-2. The payload fragments 72-0 to 72-2 and ACK 73-0 to 73-2 act as implicit RTS and CTS. Additional fragments could be indicated by a bit (field) in the frame control of the fragments (reference number 74 in FIG. 2C), allowing the receiving node to determine the remaining number of expected fragments to be received.

The discussion above, thus, illustrates a communication networks in which data forwarding blocks overhearing nodes (virtual CS) and/or nodes being able to detect the data forwarding (physical CS). However, this should merely be seen as an illustrative example of a technique for determining and defining whether a node is blocked or not. The present invention can therefore be applied to any communication network having a blocking mechanism and is not limited to virtual/physical CS and IEEE 802.11-based networks.

Data Routing

The invention is generally applicable to any routing protocol, independent of implementation, including both distributed and centralized routing algorithms, hop-by-hop routing as well as source-routing, link-state routing and distance-vector routing (also sometimes referred to as Bellman-Ford algorithm based), proactive or reactive routing, flat or hierarchical routing, single path and multipath routing, as well as variations and combinations thereof.

For more information on routing techniques, especially in wireless ad hoc networks, reference can be made to [1].

In source-routing it is normally assumed that the source end node determines the entire route. The intermediate nodes then merely act as store-and-forward units, mindlessly forwarding the packet to the next node on the path to the destination node.

In hop-by-hop routing, each node basically determines and maintains a routing table with information, for each of a number of destinations, of a preferred next hop node. When a node receives a (payload) packet, it forwards the packet to the next hop node on the basis of information on the destination of the packet. The forwarding process continues from node to node until the packet reaches the destination.

The network nodes pass routing information and maintain their routing tables through the transfer of various routing information messages. The routing information naturally varies depending on the particular routing scheme used.

Hop-by-hop routing schemes are normally categorized into two main classes, namely link-state and distance-vector algorithms. Link-state algorithms generally flood routing information to all nodes (however solutions flooding only part of the network also exist), but each node then only sends information describing the state of its own links. Distance vector algorithms on the other hand are based on exchanging routing cost information only between neighboring nodes.

The manner in which the routing tables are determined and updated may differ from one routing scheme to another. However, a common objective is normally to find the path that is optimal in some sense, as mentioned in the background section.

For a better understanding of the invention, it may be useful to give a brief overview of an example of a commonly used type of routing algorithm. It should however be understood that the invention is not limited thereto.

A classical approach is to span a so-called shortest path multihop tree between a source node and a destination node, where each link is characterized by a delta cost ($\Delta C_{ij}$), and each node is assigned an accumulated cost to reach the destination along the determined shortest path. It should be clear that the expression "shortest path" normally corresponds to a minimum cost path, which emphasizes that the path or route is a path that offers the minimum cost with respect to some particular cost metric.

The Bellman-Ford shortest path algorithm will be used as an example of a shortest path algorithm in the following, although the Dijkstra algorithm, or any other routing algorithm for that matter, could be used as well. The Bellman-Ford algorithm has played a central role in wired networks such as the Internet, but also has an important function in wireless multihop networks. In a commonly preferred implementation, the Bellman-Ford algorithm provides shortest path determination in a distributed and "uncoordinated" fashion and guarantees convergence within a finite time period based on the exchange of routing cost information between neighboring nodes.

For the Bellman Ford algorithm, the cost $C_i$ of a node $v_i$ for each destination d of a given set of destinations may thus be determined through the distributed Bellman Ford equation:

$$C_i^{(d)} = \min_{\forall j \in M_i} \{\Delta C_{ij} + C_j^{(d)}\}, \quad (3)$$

where $v_j \in M_i$ is the neighbor index of neighbor nodes belonging to node $v_i$, $C_j$ is the cost for neighbor $v_j$ to reach destination d, and $\Delta C_{ij}$ is the cost to go from node $v_i$ to $v_j$ (i.e. the cost for a hop, or the link cost).

The number of iterations may be limited to an integer number, thereby upper limiting the number of hops, e.g. a maximum of two hops.

As mentioned above, the Bellman-Ford algorithm is easily implemented in a distributed manner. A multihop tree between source and destination in a multihop network is built and defined based on routing cost information distributed in the network. In practice, neighboring nodes exchange routing lists. Each routing list contains multiple entries, where each entry specifies a destination node, the routing cost from the node in question to the destination as well as an indication of a next hop node. The routing list is typically sent in a packet, sometimes denoted Hello packet.

A node receiving a routing list, checks whether any entry offers a more optimum route than what the nodes own list indicates. Often, timestamps or sequence numbers are included together in the entry to ensure that the new cost information is not outdated state information.

To reduce the overhead of a distributed approach, it is also common practice to restrict routing cost information from propagating all over the network. E.g. a maximum number of hops, only nodes within a certain region, or only nodes under the control of one Base Station (BS) may be allowed.

Link Cost Determination

A method of determining a link cost for routing in a wireless network according to the present invention is schematically illustrated in the flow diagram of FIG. 5. The method starts in step S1, where the number of nodes that would be blocked by the transmitting node transmitting data on a wireless link to the receiving node and/or the receiving node transmitting data on the wireless link to the transmitting node is estimated. This number, thus, reflects the total number of nodes within the wireless network that are blocked if data is forwarded during a communications session on the wireless link between the transmitting node and the receiving node. However, since payload forwarding can be preceded and followed by control data exchange (RTS, CTS, ACK frames), both nodes participating in the session may actually transmit data and can therefore potentially block neighboring nodes. This means that both the transmitting node as well as the receiving node affect and block other nodes. The total number of estimated nodes could, thus, potentially only reflect nodes blocked by the transmitting node (if the receiving node will not block any nodes, apart from itself) or the receiving node (if the transmitting node will not block any nodes, apart from itself, but most often nodes blocked by both the transmitting and receiving nodes and nodes blocked by one of the nodes.

The estimation of the number of blocked nodes can be performed intermittently, periodically, at pre-defined time instances and/or in response to an estimation-triggering event, which is schematically illustrated by the line L1 in the figure.

Figure 6:
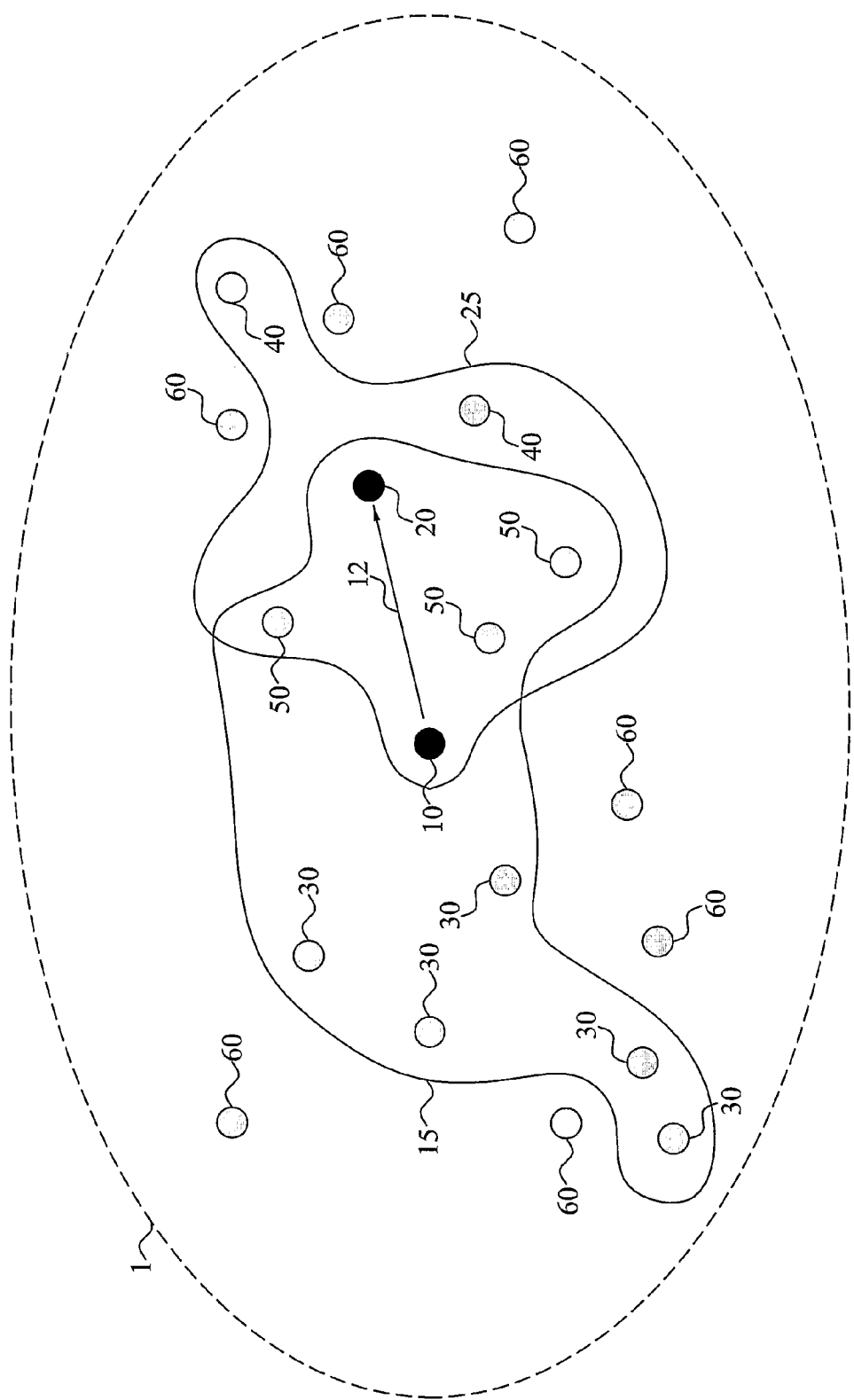
FIG. 6 is a schematic overview of a wireless communication network in which the teachings of the present invention can be applied.

FIG. 6 is a schematic overview of a communication network 1 illustrating the principle of estimating the number of blocked nodes. The network 1 includes a number of network nodes or stations 10, 20, 30, 40, 50, 60 that can communicate through multihop communication. The network 1 could e.g. be an IBSS of an IEEE 802.11 WLAN. The network nodes 10, 20, 30, 40, 50, 60 could be stationary or mobile.

In this figure, a transmitting node 10 will block a first set 15 of nodes 30, 50 when transmitting data on the link 12 to the receiving node 20. In addition, the receiving node 20 will likewise block a second set 25 of nodes 40, 50 when transmitting data on the link 12 to the transmitting node 10. Other nodes 60 that are out of the transmission range of the two nodes 10, 20, i.e. does not belong to either the first 15 or second 25 set, will not be blocked and may therefore transmit data even during an ongoing communication session involving the transmitting 10 and receiving node 20. In this illustrative figure, the first set 15 comprises eight nodes 30, 50, i.e. the transmitting node 10 blocks eight nodes 30, 50, whereas the receiving node 20 blocks five nodes 40, 50, i.e. the second set 25 comprises five nodes 30, 50. However, three nodes 50 belong to both sets 15, 25 and are potentially blocked by both the transmitting 10 and receiving 20 nodes. As a consequence, the number of blocked nodes as estimated in step S1 of FIG. 5 will be ten and not 9+5=14.

Applying this principle to an IEEE 802.11-based network 1, the nodes 30, 50 will be blocked by the transmitting node 10 transmitting the RTS frame and forwarding the payload data to the receiving node and the nodes 40, 50 will be blocked by the receiving node 20 returning the CTS and ACK frames. In the figure, the arrow that represents the wireless link 12 between the communicating nodes 10, 20 is directed from the (transmitting) node 10 having payload data to be forwarded and points to the (receiving) node 20 to which the payload data is to be forwarded. For such an IEEE 802.11-based network 1, a node 30, 40, 50 is regarded as blocked if the node 30, 40, 50 is able to overhear (extract duration value and set NAV, virtual CS) or at least detect (exceed power or interference level, physical CS) the data transmission between the two nodes 10, 20.

As is seen from FIG. 6, the propagation conditions could be such that it is not necessarily the distance from the transmitting node 10 (or receiving node 20) that induces blocked nodes.

Returning to FIG. 5, in a next step S2, the link cost for the wireless link between the transmitting node and the receiving node is determined, at least partly, based on the estimated total number of blocked nodes. In an embodiment, the link cost is based solely on the estimated number of blocked nodes. However, also other criterion may be used in this link cost determination, which is discussed in more detail below.

This link cost determination of step S2 may be updated based on new measurements or estimations of the number of block nodes and/or based on other new input information employable in the determination process, which is schematically illustrated by the line L2.

The method then ends.

Link-Cost Based Route Determination and Data Routing

The usage of a link cost that is based on the total number of blocked nodes according to the present invention will, when employing the link cost in a route determination and data forwarding, result in that packets are sent along a route in the network that minimizes the number of blocked stations. Thus, by minimizing the accumulated number of truly blocked nodes along a path, the metric of the invention allows more stations in the network to be concurrently active. The net result is a higher network capacity.

Figure 7:
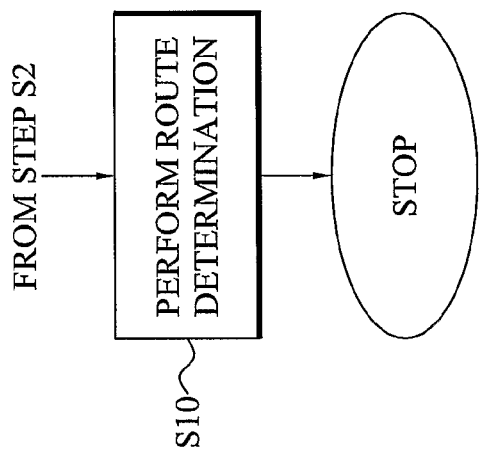
FIG. 7 is a flow diagram illustrating an additional step of the method in FIG. 5, in which the determined link cost are employed for performing route determination.

FIG. 7 is a flow diagram of an additional step to the method depicted in FIG. 5. The combined flow diagram containing steps S1 and S2 of FIG. 5 and step S10 of FIG. 7 defines a method for link-cost based route determination according to the present invention.

The method continues from step S2 of FIG. 5. In a next step S10, route determination is performed at least partly based on the link cost determined according to the present invention. By employing a link cost determined based on the total number of nodes that may be blocked when forwarding data on the communication link, optimal, or at least appropriate, paths for routing information between different network nodes can be determined for IEEE 802.11 WLAN and other FAMA- and contention-based networks.

The method then ends.

Figure 8:
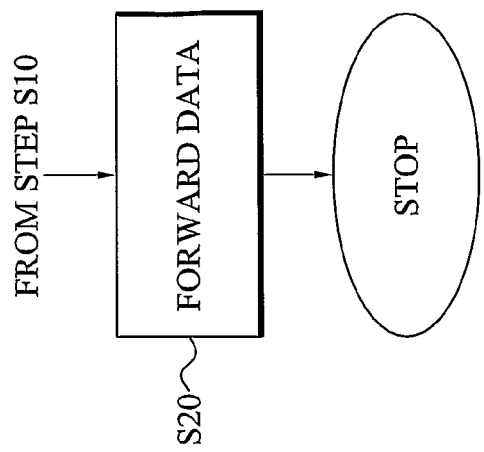
FIG. 8 is a flow diagram illustrating an additional step of the method in FIG. 7, in which data is forwarded in accordance with the route determination.

FIG. 8 is a flow diagram of an additional step to the method of FIG. 7. The combined flow diagram containing steps S1 and S2 of FIG. 5, step S10 of FIG. 7 and step S20 of FIG. 8 defines a method for link-cost based routing of data in a wireless multihop network.

The method continues from step S10 of FIG. 7. In a next step S20, data is forwarded from a given node to at least one neighbor node on the path to a given destination node in accordance with the route determination. In this forwarding process, packets are forwarded from source to destination via a set of suitable intermediate nodes along a path determined during the route determination.

The method then ends.

FIG. 9 depicts a network 1 consisting of a number of nodes $v_0$ to $v_{13}$, in which the principles of route determination and packet forwarding is illustrated. FIG. 10 is a magnification of the portion of the network 1 of FIG. 9 enclosed by the dotted line. As is seen in FIG. 9 and is more clearly illustrated in FIG. 10, each link between two nodes is associated with a link cost that according to the present invention is determined based on the number of nodes that will be blocked if data is transmitted on the link. Due to different radio conditions, such as interference sources, transmit power levels, etc., the link cost $\Delta C_{ij}$ associated with forwarding data from a node $v_i$ to a node $v_j$ is not necessarily the same as the link cost $\Delta C_{ji}$ for forwarding data in the opposite direction on the link, i.e. from the node $v_j$ to the node $v_i$. This will be discussed in more detail below. Even though data forwarding can involve bi-directional traffic exchange, the direction of the payload forwarding is decisive in this case, e.g. the link cost $\Delta C_{0,4}$ is relevant when payload data (data packet) is forwarded from node $v_0$ to node $v_4$.

In order to route (forward) data in the network 1, the link costs for the different links are determined, followed by a route determination based on the determined link costs. The most appropriate routing path as determined by the route determination is depicted by a bold line in the figures. This path minimizes the number of blocked nodes when forwarding data from the source node $v_0$ to the destination node $v_{13}$ and thereby allows more nodes in the network to be concurrently active and increases the network capacity.

ILLUSTRATIVE EMBODIMENTS AND IMPLEMENTATIONS

FIG. 11 is a flow diagram illustrating an embodiment of the estimating step of FIG. 5 in more detail. The method starts in step S30 where a first set of nodes $N_i$ potentially blocked by a transmitting node $v_i$ is determined. In a preferred embodiment of the present invention, this first node set $N_i$ preferably includes the intended receiving node $v_j$ or, alternatively, the intended receiving node $v_j$ and the transmitting node $v_i$ itself. Whichever of these two preferred embodiments one chose to employ may be an implementation issue and does not affect the outcome of the teachings of the present invention. In FIG. 6, the first set 15 includes eight blocked nodes 30, 50 or ten nodes 30, 50 if the set 15 also contains both the sending node 10 and the receiving node 20. In a next step S31, a second set of nodes $N_j$ potentially blocked by a receiving node $v_j$ is determined. This set $N_j$ preferably includes the transmitting node $v_i$ from which the receiving node $v_j$ receives payload data or both the transmitting $v_j$ and receiving $v_i$ nodes, in line with the discussion above. In FIG. 6, the second set 25 comprises five nodes 40, 50 or seven nodes 40, 50 depending on whether the transmitting node 10 and receiving node 20 are counted or not.

The following step S32 involves calculation of a function of the cardinal number of the union of the two sets $N_i$, $N_j$, i.e. $|N_i \cup N_j|$, where $|\ldots|$ represents the cardinal number and $\cup$ represents the union. As a person skilled in the art understands, the union of two sets is mathematically defined as the set containing all and only the members of the two given sets. The cardinal number is the total number of elements in a mathematical set. The resulting cardinal number will, thus, represent the total number of nodes that are blocked by at least one of the two nodes involved in the data forwarding. As a consequence, the link cost of the invention can be based on this cardinal number or a function that has the cardinal number as input.

The calculation of the cardinal number and the determination of the two sets can be performed periodically, intermittently and/or in response to a triggering event, which is schematically illustrated by the line L3. The method then continues to step S2 of FIG. 5.

FIG. 12 is a flow diagram illustrating an embodiment of the determining steps of FIG. 11 in more detail. The method starts in step S40, where the first node set is determined by identifying the network nodes that are within communication or interference range of the transmitting node. This can be realized by the transmitting node keeping and updating a list of network nodes to which it has forwarded data and from which it has successfully received data. The list will then contain those (neighbor) nodes in the network that are within communications range. These nodes may then potentially be blocked by the transmitting node due to the virtual sensing mechanism. However, data forwarding from the transmitting node may potentially also, due to the physical sensing mechanism, block other nodes. These nodes will detect the data forwarding even if they may actually not decode the transmitted data. This means that the list or set of blocked nodes preferably also contains those nodes that are within interference or detection range from the transmitting node.

The set or list preferably contains identities of the relevant blockable nodes, e.g. their unique MAC addresses used as identifiers in IEEE 802.11 or temporary identifiers for power saving in IEEE 802.11.

In a next step S41, those nodes belonging to the second set, i.e. nodes being within communication and/or interference range of the receiving node, are identified. In a first embodiment, the receiving node compiles this list similar to the transmitting node described above. This list is then disseminated to the surrounding nodes, e.g. as a part of a beacon, a Hello message or as a self-contained routing message. A node, including the transmitting node, overhearing this message determines the union of the list from the receiving node and its own corresponding list. The cardinality of the resulting set gives the estimated number of blocked nodes.

In a second embodiment of this identifying step S41, the transmitting node monitors any messages sent to and from the receiving node. In this manner, the transmitting node can determine the second set of nodes that will be blocked by the receiving node at a communication instance by investigating the address fields of the overheard messages (files 76, 77, 79, 80, 81, 83 in FIGS. 2A to 2D). The node then determines the union and the cardinal number of the first and second set.

As is evident for the person skilled in the art, a link cost is preferably estimated for each link between a node pair in the network. With reference anew to FIG. 9, this means, for example, that the node $v_4$ which potentially can communicate with seven other nodes $v_0, v_1, v_2, v_3', v_5, v_7, v_8$, in addition to its own list or set $N_4$ will receive or determine a corresponding list or set $N_0, N_1, N_2, N_3, N_5, N_7, N_8$ for each of the neighbor nodes $v_0, v_1, v_2, v_3, v_5, v_7, v_8$. The node $v_4$ then determines the union of its set $N_4$ and each of the sets $N_0, N_1, N_2, N_3, N_5, N_7, N_8$ and calculates the corresponding link costs as $\Delta C_{4,x} = |N_4 \cup N_x|$, where x=0, 1, 2, 3, 5, 7 or 8.

FIG. 13 schematically illustrates such a set or list 90 for the node $v_4$ in FIG. 9. The list includes, as was mentioned above, identifiers of the neighboring nodes $v_0, v_1, v_2, v_3, v_5, v_7, v_8$ that may be blocked by the node $v_4$. In a preferred implementation, the list 90 also contains, preferably for each node entry, a time-to-live value or time stamp $t_0, t_1, t_2, t_3, t_5, t_7, t_8$. These time-to-live values $t_0, t_1, t_2, t_3, t_5, t_7, t_8$ reflect the time at which the associated node identifier $v_0, v_1, v_2, v_3, v_5, v_7, v_8$ was entered in the list 90 or the last time it was updated. If the time-to-live value $t_0, t_1, t_2, t_3, t_5, t_7, t_8$ for a node $v_0, v_1, v_2, v_3, v_5, v_7, _8v$ has expired, the node identifier is preferably deleted for the list. The reason for this is that e.g. due to mobility, the relevant node is no longer within communication or interference range from the node $v_4$ and will, therefore, no longer become blocked by this node $v_4$. This means that the set 90 preferably is updated throughout operation to be as up-to-date as possible and only contain identifiers of the nodes $v_0, v_1, v_2, v_3, v_5', v_7, V$ that currently potentially can be blocked by the node $v_4$.

Each time the node $v_4$ transmits data to or receives data from a node, it preferably updates the time-to-live value for this node to reflect that is within blocking distance from the node $v_4$. Correspondingly, each time the node $v_4$ overhears or intercepts a message from a node, it updates the corresponding time-to-live value or enters the node in the set 90 if not already found therein. More infrequent updatings are also possible.

The node set 90 could also include the corresponding calculated link costs $\Delta C_{4,0}, \Delta C_{4,1}, \Delta C_{4,2}, \Delta C_{4,3}, \Delta C_{4,5}, \Delta C_{4,7}, \Delta C_{4,8}$ for the links to the nodes $v_0, v_1, v_2, v_3, v_5, v_7, v_8$ of the set 90.

In a third embodiment of the step S41 in FIG. 12, each node compiles its own list of nodes that are expected to become blocked at a communication instance as above. This list is then submitted to a central entity in the communication network that determines the union and cardinal number for every node pair. This embodiment, thus, allows for a centralized operation, whereas the two previous embodiments employ a distributed operation.

As was mentioned in the foregoing, the link cost can be partly based on the estimated number of blocked nodes for a communication instance involving two nodes. Other parameters could also be employed, including the (current) link quality for the wireless link between the two communicating nodes. This link-quality dependence can be realized by estimating a current Signal-to-Noise Ratio (SNR) margin for the communication link. The link cost can then be defined as:

$$\Delta C_{ij} = |N_i \cup N_j| \times \frac{1}{SNR_{ij}^{margin}} \quad (4)$$

where $SNR_{ij}^{m\ arg\ in}$ is the difference between the actual or expected SNR value (or average SNR over time) for the link between the nodes $v_i$ and $v_j$ and the minimum SNR that the link supports. This means that links experiencing a currently high link quality will be favored compared to low quality links. Each node, then, preferably comprises equipment for estimating the SNR value and computing the SNR margin.

Another parameter employable for the determination of the link cost of the invention is the expected transmit duration for the data forwarding from the transmitting to the receiving node, preferably, normalized per bit. The link cost can then be defined as:

$$\Delta C_{ij} = |N_i \cup N_j| \times \overline{T_{ij}} \quad (5)$$

where $\overline{T_{ij}}$ is the expected transmit duration normalized per bit. The expected transmit duration is determined based on the expected inverse link rate $E\{1/r_{ij}\}$ that is supported between node $v_i$ and node $v_j$.

FIG. 14 is a flow diagram illustrating an embodiment of the link cost determining step of FIG. 5 that employs this additional parameter. The method continues from step S1 of FIG. 5. In a next step S50, the link rate supported for the link between the transmitting and receiving nodes is estimated. This estimation is performed according to prior art techniques well-known to the person skilled in the art. The transmit duration normalized per bit is then calculated based on the inverse of this estimated link rate. The link cost for the relevant wireless communication link is determined based on this, preferably per bit normalized, transmit duration and the estimated number of blocked nodes according to equation (5) above. The method then ends.

By incorporating the communication duration with cardinality for the joint set of nodes exposed for blocking, the link cost helps, during route determination, to find a path that avoids long blocking exposures as well as strives for minimizing the number of blocked nodes. Apart from offering a heuristically good path, i.e. with few hops and low delay, the incorporation of transmit time further strives to yield a heuristically near minimum delay path.

Computational Example

In order to illustrate the operation, and the soundness of the suggested metric, a shortest path algorithm deploying the metric was executed. A power law path gain model was used, i.e.

$$G_{ij} = k \times \frac{1}{R_{ij}^{\alpha}},$$

where $R_{ij}$ is the distance between node $v_i$ and $v_j$, k is a constant and $\alpha=3$. The transmit range is defined as the range that a node reaches with a Shannon capacity of 0.5 b/Hz/s and the power was adjusted to avoid any partitioning of the network. All nodes within this so called transmit range is considered to be blocked at an instance of communication. Also, nodes separated further than the transmit range is considered unreachable for each other, and hence their respective link costs are set to infinity.

FIG. 15A illustrates a cost tree (a shortest path tree) that has been determined when employing the estimated number of blocked nodes as the sole link cost. In the figure, a given destination is depicted in the middle of the circle 95 (at location [0.75,0]) and a cost tree is built from the destination node. This corresponds to the case of pro-active routing. It should though be understood that it is feasible to build the cost tree the other way around, i.e. outgoing from the source—searching for a desired destination, for so-called reactive routing. The transmit range, wherein other nodes are blocked, are shown with a circle 95. The small circles show the nodes and the lines indicate the links.

As the end-to-end routing cost is of integer type in this example, the choice may arise amid two equal end-to-end routing costs. As any of those may be selected, some of the paths selected may cross other paths that appear more natural to select. This is dealt with better in the example below.

In FIG. 15B, the link cost metric as defined in equation (5) has been employed, i.e. containing the per bit normalized transmit duration in addition to the estimated number of blocked nodes. Here, the inverse Shannon channel capacity is used to estimate the expected transmit duration per bit. A slightly more esthetical appealing routing tree arises, compared to FIG. 15A, but it is also slightly more complex as link adaptation capabilities are assumed.

The diagrams of FIGS. 15A and 15B show that the model proposed by the invention works and further illustrates the feasibility and soundness of the link cost employed by the invention.

Implementation Aspects

FIG. 16 is a schematic block diagram of a network node 100 according to the present invention. The network node 100 basically comprises a transmission/reception (TX/RX) module or unit 200, a link cost determination module or unit 300, a routing module or unit 400 and a data forwarding module or unit 500. The TX/RX module 200 normally has capabilities for modulation/demodulation and coding/decoding as well as frequency conversion capabilities if required.

The link cost determination module 300 determines the link cost for wireless links between the network node 100 and neighbor nodes. This determination module 300 includes an estimator 310 for estimating the number of nodes that will become blocked if the node 100 forwards data to a neighbor node. This number estimation is preferably based on determining the cardinal number of the union of two sets of blocked nodes, where the first set contains the identifiers of the nodes blocked by the transmissions of the network node 100 in the data forwarding and the second set contains the identifiers of the nodes blocked by the transmissions of the neighbor node in the data forwarding. The estimator 310 typically performs this number estimation based on input information from the neighbor nodes, e.g. reception of node sets or lists. These received node lists and the corresponding list for the network node 100 are preferably stored in a memory 330 in connection with and accessibly by the estimator 310. Alternatively, the estimator 310 estimates the number of block nodes, at least partly, based on the transmission/reception of data packets by the TX/RX module 200.

The estimated number of blocked nodes from the estimator 310 is input to a link cost calculator 320 that determines the link cost for the wireless link between the node 100 and the relevant neighbor node, at least partly, based on the received estimated number. The link cost calculator 320 may optionally receive additional input information from a SNR estimator 350 and/or link rate estimator 340, which is used in the link cost calculation process. For example, the SNR estimator 350 continuously, periodically or intermittently (based on triggering event) monitors the current link quality and preferably determines a current SNR margin for the link. The link cost calculator 320 utilizes the inverse of this SNR margin value in the link cost calculation, as was discussed in the foregoing. Alternatively, or in addition, information of the current link quality is forwarded to the link rate estimator 340 that uses this information for determining the current link rate and finally the estimated transmit duration normalized per bit. Also this normalized transmit duration can be employed by the link cost calculator 320 for determining an appropriate link cost.

The routing module 400 receives information on the determined link cost, preferably together with complementary multihop cost information (depending on the used routing algorithm). A route determiner 410 of this routing module 400 uses the input information and performs the required route determination procedure, preferably based on a shortest path algorithm. A route table 420 may be optionally stored in the routing module 400 for storing the determined routing tree.

The packet forwarding module 500 is responsible for forwarding packets further on in the network and therefore transfers received packets, temporarily stored in a receive buffer 520, to a transmission buffer 530 for encapsulation into new packets by an encapsulation unit 510 for transmission to other network nodes. The packet forwarding module 500 may also instruct the TX/RX module 200 on which transmit parameters to use. Those parameters may be received either from the routing module 400, or from the SNR estimator 350 for more up to date channel characteristics information. The packets (already having a destination address) to be sent are prepared with at least (next hop) address information in accordance with routing information stored in the routing table 420. Naturally, the packet forwarding module 500 may also transfer packet data in the receive buffer 520 further on into the network node 100, e.g. for use in various node-internal (higher layer) applications. Correspondingly, data to forward to other nodes may be obtained from these internal applications.

The units 200, 310, 320, 340, 350, 410 and 510 of the network node 100 may be provided as software, hardware or a combination thereof. The network node 100 may in turn be arranged or provided in a wireless communications network or system, including both cellular systems and multi-hop systems. It is anticipated by the present invention that a network according to the invention could implement only the TX/RX module and the link cost determination module or implement only the TX/RX module, the link cost determination module and the routing module. For example, the network node could then be used for determining link costs and/or performs route determination on behalf of other nodes in the network.

FIG. 17 is schematic block diagram of a possible implementation of the node number estimator 310 of FIG. 16 in more detail. The estimator 310 includes a unit or module 312 for determining a set of nodes that are blocked by the network node at a communication instance. This determined set, thus, includes the neighbor nodes that are within communication and/or interference range from the network node. A corresponding unit or module 314 for determining, preferably for each neighbor node, a respective set containing those nodes that are blocked by a given neighbor node at a communication instance. This means that one such set is preferably determined for each neighbor node found in the first node set determined by the first set determiner 312.

The second set determiner 314 could determine these second node sets based on node identifiers received from the respective neighbor nodes, i.e. basically on node lists received from these nodes or a central network unit. Alternatively, or in addition, the determiner 314 generates the second sets based on address information (node identifiers) received from the TX/RX module during data transmission and reception.

The node set from the first determiner 312 and the node set(s) from the second determiner 314 are input to a cardinal calculator 316 that calculates the cardinal number of the union of the set of from the first determiner 312 and each of the sets from the second determiner 314. The results are estimates of the number of nodes that will become blocked if the network node transmits data on links to its neighboring nodes.

The units 312 to 314 of the node number estimator 310 may be provided as software, hardware or a combination thereof. The units 312 to 314 may be implemented together in the node number estimator 310. Alternatively, some of the units are implemented directly in the link cost determination unit of FIG. 16.

Additional Remarks

The link cost of the present invention based on the total number of nodes that become blocked by a data forwarding on a wireless link between network nodes can potentially also be employed for scheduling data forwarding in addition to route determination. In such a scheduling, the number of blocked nodes for a wireless link originating from a transmitting node is estimated as described in the foregoing, preferably for each wireless link to a neighbor node in a candidate node set. Thereafter, a flow among multiple flows represented in the transmitting node is selected based on the estimated number of blocked nodes. A data packet is provided from a transmit queue in the transmitting node based on the selected flow and the data packet is forwarded to at least one network node. This at least one network node is preferably one of the nodes in the candidate set, i.e. for which the transmitting node has calculated an estimated number of blocked nodes.

In this case, the transmitting node does not necessarily have to forward the first (head of the queue) data packet in its transmit queue but may, based on the estimate(s) of blocked nodes, select and forward another packet. The reason for this is that, due to fading conditions and mobility, it might, from network capacity point of view, be more advantageous to first forward another packet rather than the packet found in the head of the line of the transmit queue. Thus, the current radio and network conditions might result in unusually many blocked nodes if the transmitting node would forward the head of the line packet first. By, however, postponing the transmission of this packet and instead send another data packet, typically intended to another node, the radio and network conditions might change so that the number of nodes that will become blocked at the subsequent transmission occasion will be reduced.

Traditional packet forwarding based on, for example, the Bellman-Ford algorithm is trivial in the sense that there is normally only one next hop choice. Other forwarding protocols, however, such as Cisco's IGRP [2], Random Forward Routing [3], Opporture Routing [4, 5], Selection Diversity Forwarding [6], and Anycast [7] and the more recent Multi-user Diversity Forwarding [8] enables a node to send a received packet to one out of several optional nodes. The forwarding process therefore involves a non-trivial choice to be made amid a set of favorable nodes. These schemes are sometimes denoted Forward-Decision Based Routing, FDBR, and is routing in its most adaptive form, i.e. taking an adaptive decision at each forwarding instance. These more advanced forwarding protocols may operate based on cost information from an underlying route/cost determination protocol such as a shortest path protocol like Bellman-Ford. This forwarding operation, as described in [4]-[8], is advantageous when the link communication quality varies unpredictably due to fading channels or unpredictably varying interference level, whereas [2] and [3] offer some advantages of distributing load over multiple nodes and paths.

In particular, diversity forwarding protocols may even operate based on a route determination protocol that is more customized to diversity forwarding. The link cost determination according to the invention can also be used with great advantage in such customized route determination protocols.

It will be understood by a person skilled in the art that various modifications and changes may be made to the present invention without departure from the scope thereof, which is defined by the appended claims.

REFERENCES

[1] X. Zou, B. Ramamurthy, S. Magliveras, "Routing Techniques for Wireless Ad Hoc Networks—Classification and Comparison" Proc. of the Sixth World Multiconference on Systemics, Cybernetics, and Informatics—SCI, July 2002

[2] C. L. Hedrick Rutgers, "Cisco-An introduction to IGPR", 22 Aug. 1991, http://www.cisco.com/warp/public/103/5.html

[3] R. Nelson, L. Kleinrock, "The spatial capacity of a slotted ALOHA multihop packet radio network with capture", IEEE Transactions on Communications, 32, 6, pp 684-694, 1984

[4] WO 96/19887

[5] WO 98/56140

[6] US 2002/0051425 A1

[7] S. Jain, Y Lv, S. R. Das, "Exploiting Path Diversity in the Link Layer in Wireless Ad Hoc Networks", Technical Report, WINGS Lab, July 2003

[8] US 2004/0233918 A1

The invention claimed is:

1. A method of link cost determination for routing in a wireless network, the method comprising:
   determining a first set of nodes that are blocked from transmitting by a first node of a node pair transmitting data on a wireless link to a second node of the node pair; determining a second set of nodes that are blocked from transmitting by the second node transmitting data on the wireless link to the first node;
   determining a link cost for the wireless link based on the first set of nodes and the second set of nodes; and
   performing route determination at least partly based on the determined link cost.

2. The method of claim 1, further comprising forwarding data from a given node to at least a neighbor node on the path to a given destination node, in accordance with the route determination.

3. The method of claim 1, wherein performing route determination comprises performing route determination at least partly based on the determined link cost and a shortest path type algorithm.

4. The method of claim 1, wherein determining the link cost is based on the cardinal number of the union of the first set and the second set.

5. The method of claim 1, wherein the first set also comprises the second node and the second set also comprises the first node.

6. The method of claim 1, wherein determining the second set of nodes that are blocked from transmitting by the second node transmitting data on the wireless link to the first node comprises:
   receiving, from the second node, information of the nodes that are able to directly and wirelessly communicate with the second node; and
   determining the second set based on the received information.

7. The method of claim 1, wherein determining the second set of nodes that are blocked from transmitting by the second node transmitting data on the wireless link to the first node comprises:
   overhearing data transmissions to and from the second node; and
   determining the second set as comprising the nodes involved in the overheard data transmissions.

8. The method of claim 1, wherein each node of the first set and the second set is associated with a time-to-live value, the method further comprising deleting a node from the first set or the second set if the time-to-live value associated with the node has expired.

9. The method of claim 1, further comprising estimating an actual link quality for the wireless link, wherein determining the link cost for the wireless link comprises determining the link cost based on the first set of nodes and the second set of nodes and based on a difference between the estimated actual link quality and a minimum required link quality for the wireless link.

10. The method of claim 1, wherein determining the link cost for the wireless link comprises determining the link cost based on the first set of nodes and the second set of nodes and based on an expected transmit duration per bit for routing data from one node of the node pair to the other node of the node pair.

11. The method of claim 10, further comprising:
   estimating an expected link rate for the wireless link; and
   determining the expected transmit duration per bit based on the estimated expected link rate.

12. The method of claim 1, wherein a node is regarded as blocked from transmitting if the node is able to detect a signal power level that exceeds a minimum signal power threshold caused by transmission of data by at least one node of the node pair.

13. The method of claim 1, wherein a data packet includes a duration value indicating an expected time during which the wireless communications medium is locally reserved for the data packet and its subsequent induced communication, and wherein a node overhearing transmission of the data packet is regarded as blocked from transmitting until the expected time has expired.

14. The method of claim 1, wherein the wireless network is a contention-based wireless network.

15. A network node configured for link cost determination for routing in a wireless network, the network node comprising:
   a node number estimator configured to determine a first set of nodes that are blocked from transmitting by a first node of a node pair transmitting data on a wireless link to a second node of the node pair and to determine a second set of nodes that are blocked from transmitting by the second node transmitting data on the wireless link to the first node;
   a link cost calculator configured to determine a link cost for the wireless link based on the first set of nodes and the second set of nodes; and
   a routing module configured to perform route determination at least partly based on the link cost determined by the determining means.

16. The network node of claim 15, further comprising a data forwarding module configured to forward data from a given node to at least a neighbor node on the path to a give destination node, in accordance with the route determination.

17. The network node of claim 15, wherein the routing module is configured to perform route determination at least partly based on the link cost determined by the link cost calculator and a shortest path type algorithm.

18. The network node of claim 15, wherein the link cost calculator is configured to determine the link cost based the cardinal number of the union of the first set and the second set.

19. The network node of claim 15, wherein the first set comprises the second node and the second set comprises the first node.

20. The network node of claim 15, wherein node number estimator is configured to determine the second set based on information, received from the second note, of the nodes that are able to directly and wirelessly communicate with the second node.

21. The network node of claim 15, wherein node number estimator is configured to determine the second set as comprising the nodes involved in data transmissions to and from the second node and overheard by the first node.

22. The network node of claim 15, wherein each node of the first set and the second set is associated with a time-to-live value, and wherein the node number estimator is further configured to delete a node from the first set or the second set if the time-to-live value associated with the node has expired.

23. The network node of claim 15, further comprising an SNR estimator configured to estimate an actual link quality for the wireless link, wherein the link cost calculator is configured to determine the link cost based on the first set of nodes and the second set of nodes and based on a difference between the estimated actual link quality and a minimum required link quality for the wireless link.

24. The network node of claim 15, wherein the link cost calculator is configured to determine the link cost based on the first set of nodes and the second set of nodes and based on an expected transmit duration per bit for routing data from one node of the node pair to the other node of the node pair.

25. The network node of claim 24, further comprising a link rate estimator configured to estimate an expected link rate for the wireless link and to determine the expected transmit duration per bit based on the estimated expected link rate.

* * * * *